(12) United States Patent
Taeshima

(10) Patent No.: US 7,640,456 B2
(45) Date of Patent: Dec. 29, 2009

(54) INFORMATION PROCESSOR AND DATA COMMUNICATION CONTROL METHOD CAPABLE OF PREVENTING PROBLEMS IN DATA COMMUNICATION CAUSED BY BREAKDOWNS

(75) Inventor: Shinjirou Taeshima, Tokyo (JP)

(73) Assignee: NEC Corporation, Tokyo (JP)

( * ) Notice: Subject to any disclaimer, the term of this patent is extended or adjusted under 35 U.S.C. 154(b) by 417 days.

(21) Appl. No.: 11/390,098

(22) Filed: Mar. 28, 2006

(65) Prior Publication Data

US 2006/0224767 A1  Oct. 5, 2006

(30) Foreign Application Priority Data

Mar. 29, 2005  (JP) .............................. 2005-094615

(51) Int. Cl.
*G06F 11/00* (2006.01)

(52) U.S. Cl. .................. 714/25; 710/100; 710/110; 714/11; 714/30; 714/40; 714/56; 714/799

(58) Field of Classification Search ...................... 714/2, 714/40, 30, 56, 799; 710/100, 110
See application file for complete search history.

(56) References Cited

U.S. PATENT DOCUMENTS

| | | | | |
|---|---|---|---|---|
| 5,361,267 A | * | 11/1994 | Godiwala et al. | 714/755 |
| 5,864,653 A | * | 1/1999 | Tavallaei et al. | 714/2 |
| 6,105,146 A | * | 8/2000 | Tavallaei et al. | 714/2 |
| 2003/0188221 A1 | * | 10/2003 | Rasmussen et al. | 714/11 |
| 2004/0230878 A1 | * | 11/2004 | Mantey et al. | 714/53 |

FOREIGN PATENT DOCUMENTS

| | | |
|---|---|---|
| JP | 58-211228 | 12/1983 |
| JP | 61-243552 | 10/1986 |
| JP | 05-324950 | 12/1993 |

\* cited by examiner

*Primary Examiner*—Robert Beausoliel
*Assistant Examiner*—Jeison C Arcos
(74) *Attorney, Agent, or Firm*—Foley & Lardner LLP

(57) ABSTRACT

A DGP, upon detecting the occurrence of a fault in an IOP that controls a CH, causes another IOP that can control the CH to control the CH and reports to an EPU the occurrence of the fault in the CH and the recovery from the fault. The DGP stores information in a CH configuration table indicating that the other IOP is controlling the CH. Upon receiving the reports of the occurrence of the fault in the CH and the recovery, the EPU refers to the CH configuration table, verifies that the other IOP is controlling the CH, and provides data transfer instructions to the other IOP.

6 Claims, 26 Drawing Sheets

300 Memory

400 IOP configuration table

500 CH configuration table

400 Configuration table

| IOP0-CH# | IOP0-CH# | IOP1-CH# | IOP1-CH# |
|---|---|---|---|
| IOP2-CH# | IOP2-CH# | IOP3-CH# | IOP3-CH# |
| IOP4-CH# | IOP4-CH# | IOP5-CH# | IOP5-CH# |
| IOP6-CH# | IOP6-CH# | IOP7-CH# | IOP7-CH# |

500 CH configuration table

| CH0-IOP# | CH1-IOP# | CH2-IOP# | CH3-IOP# |
|---|---|---|---|
| CH4-IOP# | CH5-IOP# | CH6-IOP# | CH7-IOP# |

Fig. 9
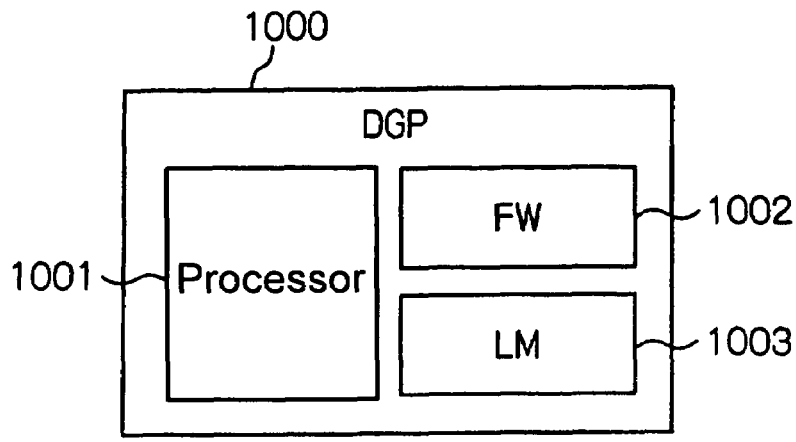
Fig. 10
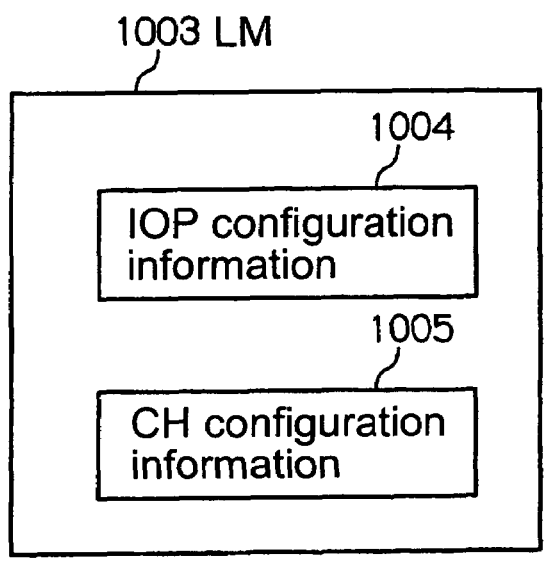
Fig. 11
1004 IOP configuration information
| IOP0-Config | IOP1-Config | IOP2-Config | IOP3-Config |
|---|---|---|---|
| IOP4-Config | IOP5-Config | IOP6-Config | IOP7-Config |

1005 CH configuration information

| CH0-Config | CHP1-Config | CH2-Config | CH3-Config |
|---|---|---|---|
| CH4-Config | CH5-Config | CH6-Config | CH7-Config |

Fig. 16

1004 IOP configuration information

| IOP0-available | IOP1-available | IOP2-available | IOP3-available |
|---|---|---|---|
| IOP4-available | IOP5-available | IOP6-available | IOP7-available |

Fig. 17

1005 CH configuration information

| CH0-available | CH1-available | CH2-available | CH3-available |
|---|---|---|---|
| CH4-available | CH5-available | CH6-available | CH7-available |

Fig. 19

400 IOP configuration table

| IOP0-CH0 | IOP0-available | IOP1-CH1 | IOP1-available |
|---|---|---|---|
| IOP2-CH2 | IOP2-available | IOP3-CH3 | IOP3-available |
| IOP4-CH4 | IOP4-available | IOP5-CH5 | IOP5-available |
| IOP6-CH6 | IOP6-available | IOP7-CH7 | IOP7-available |

Fig. 20

500 CH configuration table

| CH0-IOP0 | CH1-IOP1 | CH2-IOP2 | CH3-IOP3 |
|---|---|---|---|
| CH4-IOP4 | CH5-IOP5 | CH6-IOP6 | CH7-IOP7 |

400 IOP configuration table

| IOP0-unavailable | IOP0-unavailable | IOP1-CH1 | IOP1-CH0 |
|---|---|---|---|
| IOP2-CH2 | IOP2-available | IOP3-CH3 | IOP3-available |
| IOP4-CH4 | IOP4-available | IOP5-CH5 | IOP5-available |
| IOP6-CH6 | IOP6-available | IOP7-CH7 | IOP7-available |

500 CH configuration table

| CH0-IOP1 | CHP1-IOP1 | CH2-IOP2 | CH3-IOP3 |
|---|---|---|---|
| CH4-IOP4 | CH5-IOP5 | CH6-IOP6 | CH7-IOP7 |

Fig. 38

1004 IOP configuration information

| IOP0·available | IOP1·spare | IOP2·available | IOP3·spare |
|---|---|---|---|
| IOP4·available | IOP5·spare | IOP6·available | IOP7·spare |

Fig. 39

1005 CH configuration information

| CH0·available | CH1·unavailable | CH2·available | CH3·unavailable |
|---|---|---|---|
| CH4·available | CH5·unavailable | CH6·available | CH7·unavailable |

Fig. 40

400 IOP configuration table

| IOP0·CH0 | IOP0·available | IOP1·spare | IOP1·spare |
|---|---|---|---|
| IOP2·CH2 | IOP2·available | IOP3·spare | IOP3·spare |
| IOP4·CH4 | IOP4·available | IOP5·spare | IOP5·spare |
| IOP6·CH6 | IOP6·available | IOP7·spare | IOP7·spare |

Fig. 41

500 CH configuration table

| CH0·IOP0 | CH1·unavailable | CH2·IOP2 | CH3·unavailable |
|---|---|---|---|
| CH4·IOP4 | CH5·unavailable | CH6·IOP6 | CH7·unavailable |

400 IOP configuration table

| IOP0·unavailable | IOP0·unavailable | IOP1·CH0 | IOP7·available |
|---|---|---|---|
| IOP2·CH2 | IOP2·available | IOP3·CH3 | IOP3·available |
| IOP4·CH4 | IOP4·available | IOP5·CH5 | IOP5·available |
| IOP6·CH6 | IOP6·available | IOP7·CH7 | IOP7·available |

500 CH configuration table

| CH0·IOP1 | CH1·unavailable | CH2·IOP2 | CH3·unavailable |
|---|---|---|---|
| CH4·IOP4 | CH5·unavailable | CH6·IOP6 | CH7·unavailable |

# INFORMATION PROCESSOR AND DATA COMMUNICATION CONTROL METHOD CAPABLE OF PREVENTING PROBLEMS IN DATA COMMUNICATION CAUSED BY BREAKDOWNS

BACKGROUND OF THE INVENTION

1. Field of the Invention

The present invention relates to an information processor and a data communication control method, and more particularly to an information processor and a data communication control method capable of preventing problems in data communication resulting from breakdowns.

2. Description of the Related Art

Information processing systems are known in the prior art that include a control device that is connected to a peripheral device. In the information processing systems, when the control device suffers a breakdown, the control device is cut off from the peripheral device and the peripheral device then connected to another control device.

For example, information processing systems are described in Japanese Patent Laid-open Publication No. 211228/83 and Japanese Patent Laid-open Publication No. 243552/86 that include a switch unit that allows switching of the connections between a plurality of control devices and a plurality of peripheral devices. The information processing systems switch the connections between the control devices and peripheral devices by using the switch unit.

However, when the control device includes an arithmetic processor and an input/output processor for performing data communication with a peripheral device, the information processing systems suffer from the problems described below.

When a break-down occurs in the input/output processor while the arithmetic processor is operating normally, the normal arithmetic processor is cut off from the information processing system, resulting in the problem that a normal arithmetic processor cannot be effectively used.

An information processor that can provide a solution to this problem is currently known.

FIG. 1 is a block diagram showing an example of this type of information processor.

In FIG. 1, information processor 1 includes: diagnostic processor 2, a plurality of logic cards 3 (logic card 3a and 3b); and a plurality of channel devices 4 (channel devices 4a and 4b).

Logic card 3a includes: a plurality of arithmetic processors 3a1 (arithmetic processors 3a1a-3a1c), input/output processor 3a2, and memory 3a3. Logic card 3b further includes: a plurality of arithmetic processors 3b1 (arithmetic processors 3b1a-3b1c), input/output processor 3b2, and memory 3b3.

Diagnostic processor 2, logic cards 3a and 3b, and channel devices 4a and 4b are interconnected by bus 5. In addition, arithmetic processors 3a1a-3a1c, input/output processor 3a2, memory 3a3, arithmetic processors 3b1a-3b1c, input/output processor 3b2, and memory 3b3 are interconnected by bus 5.

Input/output processor 3a2 is placed in a fixed correspondence with channel device 4a. Input/output processor 3b2 is placed in a fixed correspondence with channel device 4b. Channel device 4a is connected to peripheral device 5a. Channel device 4b is connected to peripheral device 5a.

Input/output processor 3a2 controls channel device 4a to perform data transfer with peripheral device 5a. Input/output processor 3b2 controls channel device 4b to perform data transfer with peripheral device 5a.

As an example of the operation of information processor 1, when software, which operates on any arithmetic processor in logic card 3a, performs data transfer between peripheral device 5a and memory 3a3, the software provides data transfer instructions, which designate channel device 4a that corresponds to peripheral device 5a, to the arithmetic processor in which the software is operating. Upon receiving the data transfer instructions, the arithmetic processor provides data transfer instructions to input/output processor 3a2 that corresponds to channel device 4a. Upon receiving these data transfer instructions, input/output processor 3a2 performs data transfer with peripheral device 5a by way of channel device 4a.

When input/output processor 3a2 suffers a breakdown, data transfer to peripheral device 5a that was using input/output processor 3a2 can no longer be executed.

However, information processor 1 operates as described below to continue data transfer with peripheral device 5a.

Upon detecting the failure of input/output processor 3a2 that corresponds to channel device 4a, diagnostic processor 2 searches for another channel device (channel device 4b) that is connected to peripheral device 5a and then reports the search results to the arithmetic processor. The arithmetic processor reports these search results to the software.

When performing data transfer between peripheral device 5a and memory 3a3 after having received the search results, the software provides data transfer instructions that designate channel device 4b to the arithmetic processor. The arithmetic processor, in accordance with the data transfer instructions, provides the data transfer instructions to input/output processor 3b2 that corresponds to channel device 4b.

As a result, the arithmetic processor uses input/output processor 3b2 to continue data transfer in spite of the failure of input/output processor 3a2.

In JP-A-H05-324950, a logic card is described that can store error information.

In information processor 1, input/output processors are placed in fixed correspondence with channel devices, and as a consequence, the following problems occur in information processor 1.

For example, in the event of a failure of input/output processor 3a2 that corresponds to channel device 4a when peripheral device 5a is connected to only channel device 4a, information processor 1 is unable to perform data transfer with peripheral device 5a. As a result, information processor 1 may become incapable of executing information processing.

In addition, in the event of a failure of input/output processor 3a2 when peripheral device 5a is connected to channel device 4a and channel device 4b, not only arithmetic processor 3b1 but also arithmetic processor 3a1 performs data transfer with peripheral device 5a by way of channel device 4b. As a result, the amount of data being transferred with peripheral device 5a by way of channel device 4b increases, leading to a potential drop in performance of information processor 1.

Information processor 1 plays an important role in the current IT community, and an operation halt or drop in the performance of an information processor can therefore have a serious impact on the entire community.

SUMMARY OF THE INVENTION

It is an object of the present invention to provide an information processor and a data communication control method that can prevent operation halts and drops in performance that are caused by problems in data communication.

To achieve the above-described object, the information processor according to the present invention includes a channel device, a prescribed input/output processor, a specific input/output processor, a diagnostic processor, and an arithmetic processor.

The channel device is connected to an external device. The prescribed input/output processor is placed in correspondence with the channel device. The specific input/output processor differs from the prescribed input/output processor.

The diagnostic processor, upon detecting a fault of the prescribed input/output processor, places the specific input/output processor in correspondence with the channel device in place of the prescribed input/output processor, stores in itself the correspondence relation between the specific input/output processor and the channel device, and then supplies a fault recovery report.

The arithmetic processor, when performing data communication with the external device before receiving the fault recovery report, causes the prescribed input/output processor to execute data communication with the external device by using the channel device.

The arithmetic processor further, when performing data communication with the external device after receiving the fault recovery report, reads the correspondence relation from the diagnostic processor. Then, in accordance with the correspondence relation, the arithmetic processor causes the specific input/output processor to execute data communication with the external device by using the channel device.

According to the invention as described above, when a fault of the prescribed input/output processor is detected, the specific input/output processor is placed in correspondence with the channel device in place of the prescribed input/output processor. When data communication is subsequently performed with the external device, the specific input/output processor executes data communication with the external device that uses the channel device.

Thus, in spite of the occurrence of a fault in the prescribed input/output processor, the specific input/output processor, in place of the prescribed input/output processor, executes data communication that uses the channel device, whereby data communication can be continued by way of the channel device in spite of the occurrence of a fault in the prescribed input/output processor. Accordingly, operation halts and drops in performance of the information processor can be prevented.

Upon detection of the exchange of the prescribed input/output processor, the diagnostic processor further places the prescribed input/output processor in correspondence with the channel device in place of the specific input/output processor, stores in itself the correspondence relation between the prescribed input/output processor and the channel device, and then issues an exchange completion report to the arithmetic processor.

The arithmetic processor, when data communication is performed with the external device after receiving the exchange completion report, reads the correspondence relation from the diagnostic processor. The arithmetic processor then causes the prescribed input/output processor to execute data communication with the external device that uses the channel device in accordance with the correspondence relation.

According to the above-described invention, the prescribed input/output processor can again be placed in correspondence with the channel device automatically. Conventionally, maintenance personnel exchanged the input/output processor in which a fault had occurred for a new input/output processor and then incorporated the new input/output processor to the information processor. The possibility therefore existed in the prior art for halts of the information processor due to human error. The present invention, however, can lower the possibility for halts of the information processor due to human error.

The above and other objects, features, and advantages of the present invention will become apparent from the following description with reference to the accompanying drawings which illustrate examples of the present invention.

BRIEF DESCRIPTION OF THE DRAWINGS

FIG. 9 is a block diagram showing an example of DGP 1000;

FIG. 10 is an explanatory view showing an example of LM 1003;

FIG. 11 is an explanatory view showing an example of IOP configuration information 1004;

FIG. 16 is an explanatory view showing an example of IOP configuration information 1004;

FIG. 17 is an explanatory view showing an example of CH configuration information 1005;

FIG. 19 is an explanatory view showing an example of IOP configuration table 400;

FIG. 20 is an explanatory view showing an example of CH configuration table 500;

FIG. 38 is an explanatory view showing an example of IOP configuration information 1004;

FIG. 39 is an explanatory view showing an example of CH configuration information 1005;

FIG. 40 is an explanatory view showing an example of IOP configuration table 400;

FIG. 41 is an explanatory view showing an example of CH configuration table 500;

DETAILED DESCRIPTION OF THE PREFERRED EMBODIMENTS

Figure 1:
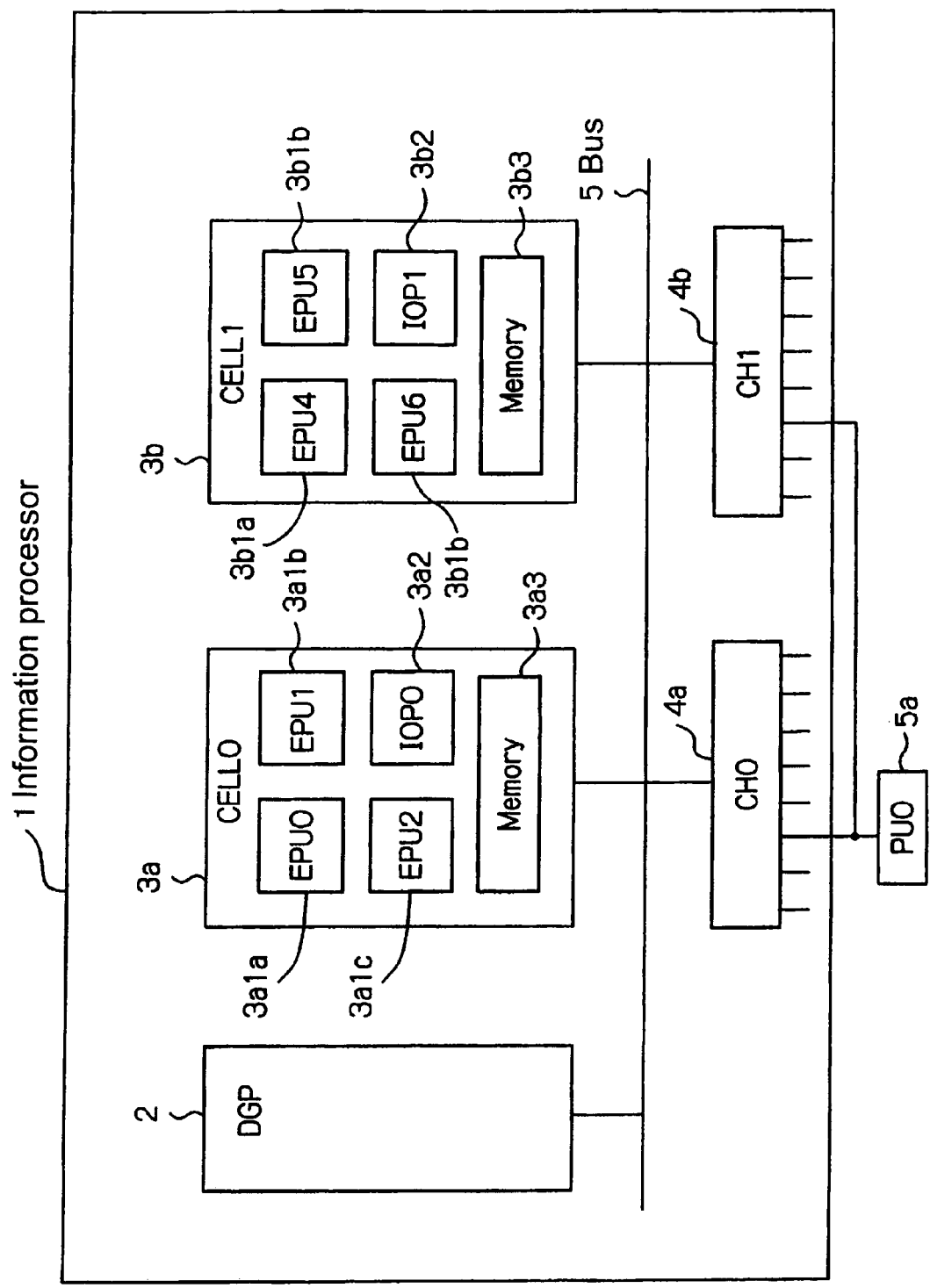
FIG. 1 is a block diagram showing an example of an information processor of the prior art.
Figure 2:
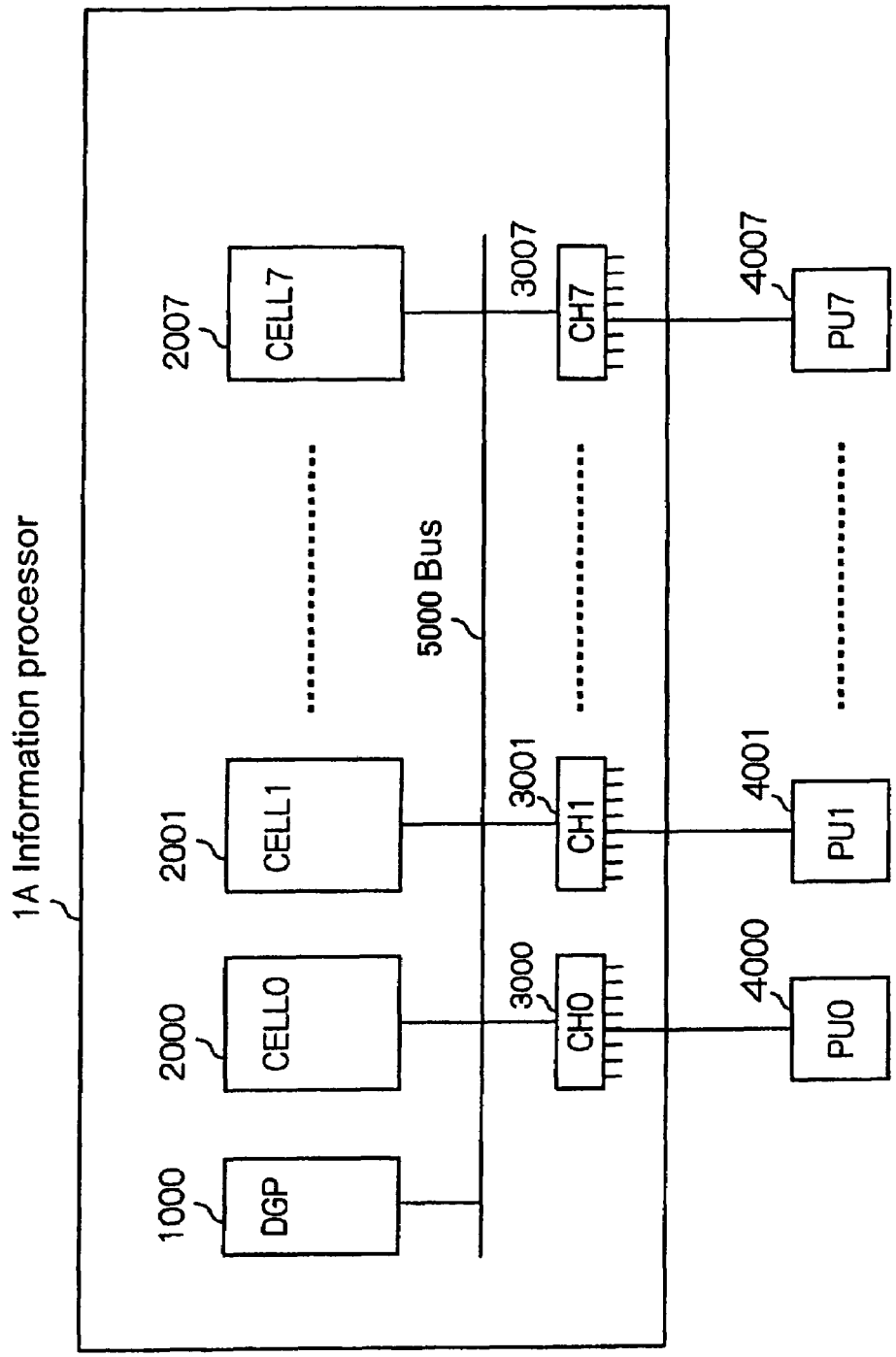
FIG. 2 is a block diagram showing an information processor according to an embodiment of the present invention.

FIG. 2 is a block diagram showing an information processor according to an embodiment of the present invention.

In FIG. 2, information processor 1A includes: diagnostic processor (hereinbelow referred to as "DGP") 1000; a plurality of logic cards (hereinbelow referred to as "CELL") 200*n* (more specifically CELL 2000-2007); a plurality of channel devices (hereinbelow referred to as "CH") 300*n* (more specifically, CH 3000-3007); and bus 5000.

DGP 1000, CELL 2000-2007, and CH 3000-3007 are interconnected by way of bus 5000.

Figure 3:
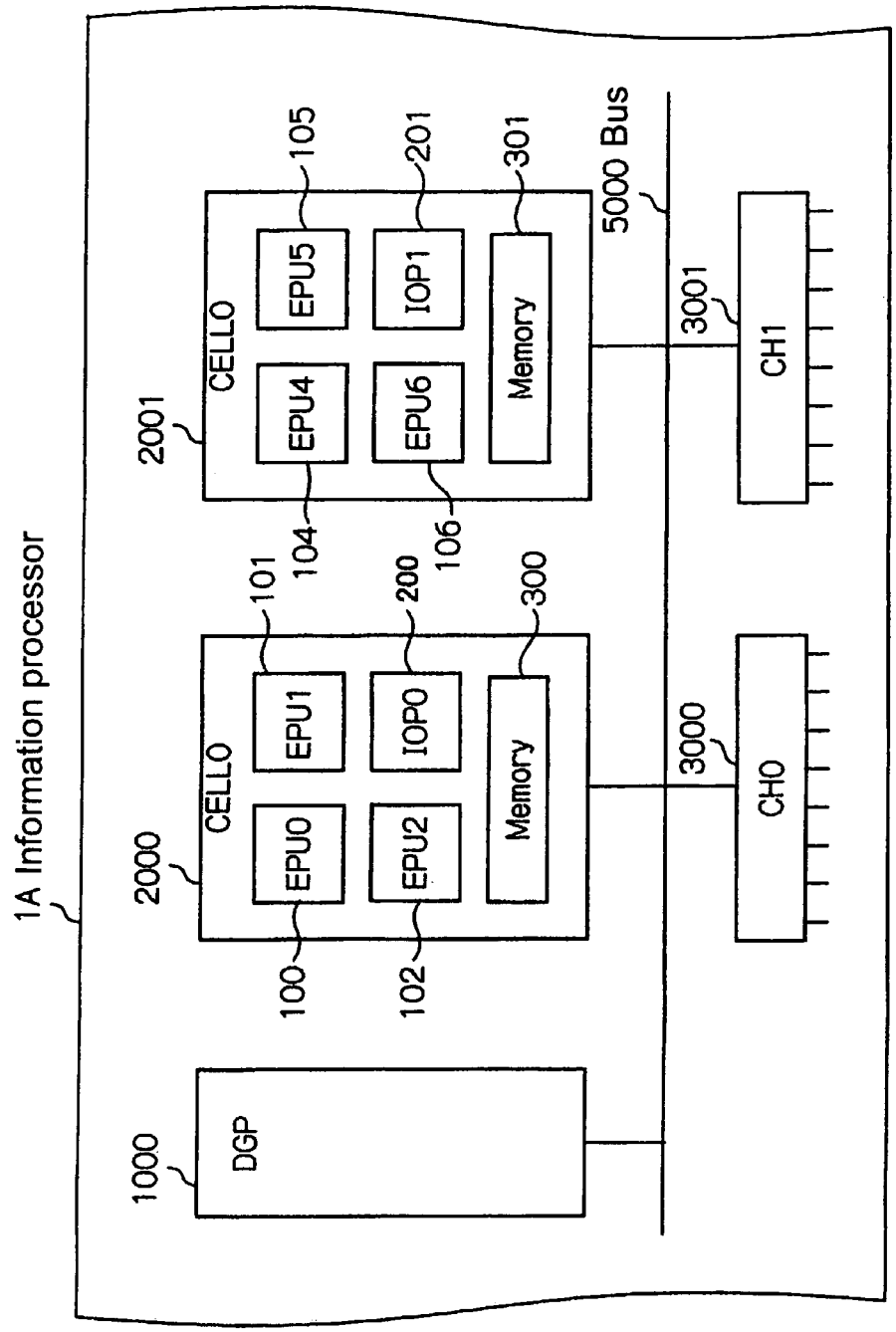
FIG. 3 is a block diagram showing an example of CELL 200*n*.

FIG. 3 is a block diagram showing an example of CELL 200*n*. To state in greater detail, FIG. 3 is a block diagram showing DGP 1000, CELL 2000, CELL 2001, CH 3000, CH 3001, and bus 5000 in information processor 1A.

A plurality of arithmetic processors (hereinbelow referred to as "EPU") 10*x* (specifically, EPU 100-102), input/output processor (hereinbelow referred to as "IOP") 200, and memory 300 are mounted in CELL 2000.

A plurality of EPU 10*x* (specifically EPU 104-106), IOP 201, and memory 301 are mounted in CELL 2001.

Although not shown in FIG. 3, a plurality of EPU 10*x* (more specifically, three EPU), IOP 20*n*, and memory 30*n* are also mounted in other CELL (specifically, CELL 2002-2007).

Each of EPU 10*x*, IOP 20*n*, and memory 30*n* in CELL 2000-2007 can access each other by way of bus 5000.

Each of EPU 10*x* is of the same configuration. Each of EPU 10*x* performs arithmetic processing in accordance with instructions of software that operates in that EPU 10*x* (hereinbelow referred to as simply "software").

Each of CH 300*n* is connected to any of a plurality of peripheral devices such as magnetic disks (hereinbelow referred to as "PU") 400*n* (specifically, PU 4000-4007) (see FIG. 2). As a result, each of EPU 10*x* is capable of performing data transfer with memory 300-307 and PU 4000-4007.

In the present embodiment, the number of CELL 200*n* is eight, but the number of CELL 200*n* is open to modification as appropriate.

In addition, CELL 200*n* each include three EPU 10*x* in the present embodiment, but the number of EPU 10*x* in CELL 200*n* is open to modification as appropriate.

Figure 4:
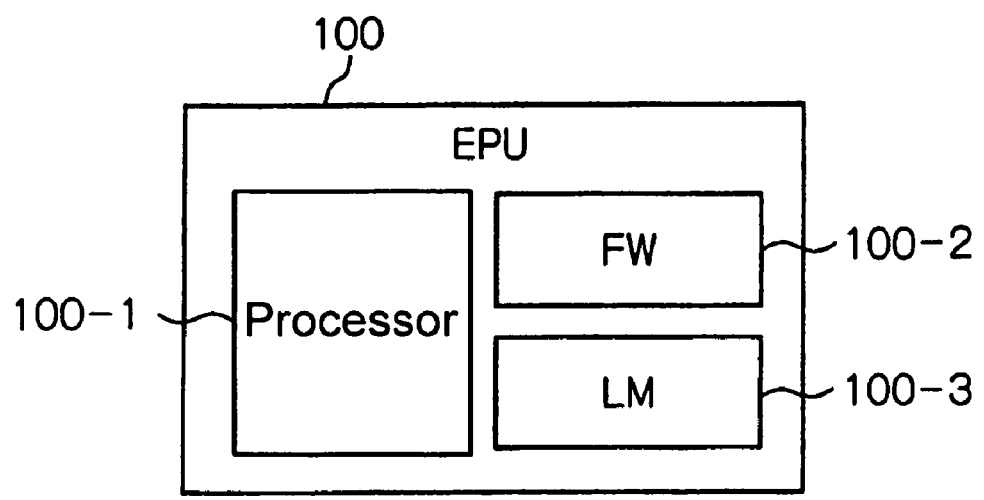
FIG. 4 is a block diagram showing an example of EPU 10*x*.

FIG. 4 is a block diagram showing an example of EPU 10*x*. Each of EPU 10*x* is of the same configuration, and EPU 100 is therefore shown in FIG. 4 as an example of EPU 10*x*.

In FIG. 4, EPU 100 includes processor 100-1, firmware (hereinbelow referred to as "FW") 100-2, and local memory (hereinbelow referred to as "LM") 100-3.

FW 100-2 performs processing of the instructions of the software (in this case, the software that operates in EPU 100).

Processor 100-1 performs processing in accordance with the instructions of FW 100-2.

LM 100-3 stores the information that is necessary for processing the instructions of the software.

Figure 5:
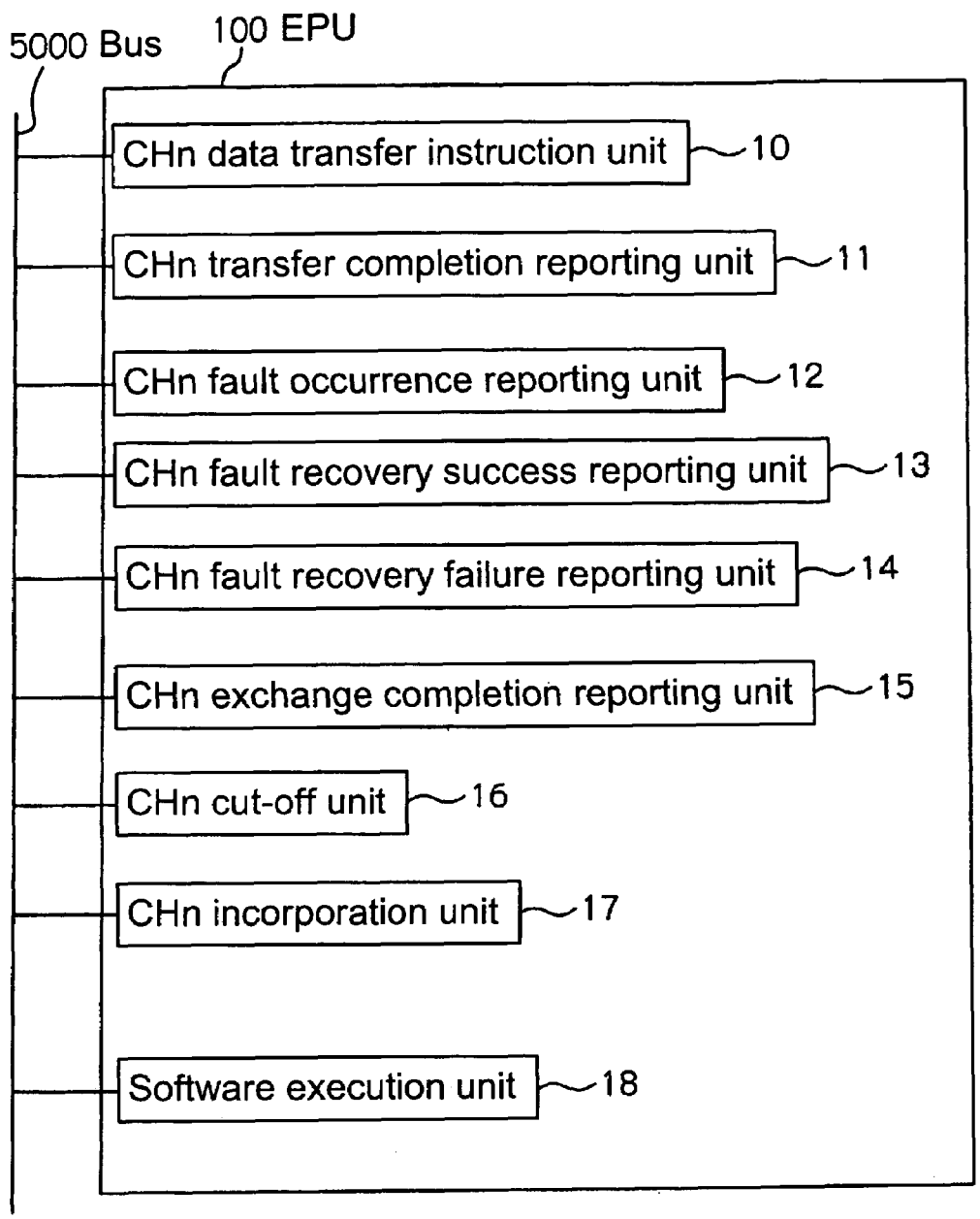
FIG. 5 is a function block diagram showing the functions possessed by EPU 100.

FIG. 5 is a function block diagram showing the functions possessed by EPU 100.

In FIG. 5, EPU 100 includes: CHn data transfer instruction unit (hereinbelow referred to as "instruction unit") 10, CHn transfer completion reporting unit (hereinbelow referred to as simply "reporting unit") 11; CHn fault occurrence reporting unit (hereinbelow referred to as simply "reporting unit") 12, CHn fault recovery success reporting unit (hereinbelow referred to as simply "reporting unit") 13; CHn fault recovery failure reporting unit (hereinbelow referred to as simply "reporting unit") 14; CHn exchange completion reporting unit (hereinbelow referred to as simply "reporting unit") 15; CHn cut-off unit (hereinbelow referred to as simply "cut-off unit") 16; CHn incorporation unit (hereinbelow referred to as simply "incorporation unit") 17; and software execution unit (hereinbelow referred to as simply "execution unit") 18.

In addition, processor 100-1 realizes execution unit 18 by executing the software in EPU 100.

Furthermore, processor 100-1 realizes each of instruction unit 10, reporting unit 11, reporting unit 12, reporting unit 13, reporting unit 14, reporting unit 15, cut-off unit 16, and incorporation unit 17 by executing FW 100-2.

Instruction unit 10 instructs IOP 20*n* to perform data transfer between memory 30*n* and PU 400*n* by way of CH 300*n* in accordance with the instructions of the software (execution unit 18). FW 100-2 includes the software that prescribes the operation of instruction unit 10.

Upon the acquisition of a transfer completion report from IOP 20*n*, reporting unit 11 reports the completion of transfer to the software. FW 100-2 includes the software that prescribes the operation of reporting unit 11.

Upon acquiring a report, which indicates the occurrence of a fault in IOP 20*n* that controls CH 300*n*, from DGP 1000, reporting unit 12 reports this information to the software. In addition, FW 100-2 includes the software that prescribes the operation of reporting unit 12.

Upon acquiring a report, which indicates that IOP 20*n* has been switched to a new IOP 20*n* and recovery therefore is successful, from DGP 1000 after the occurrence of a fault, reporting unit 13 reports this information to the software. FW 100-2 further includes the software that prescribes the operation of reporting unit 13.

Figures 42, 43, 44:
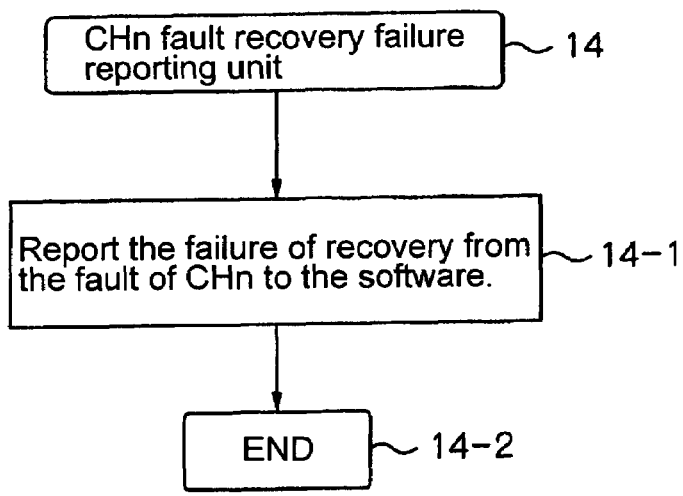
FIG. 42 is an explanatory view showing an example of IOP configuration table 400.
FIG. 43 is an explanatory view showing an example of CH configuration table 500.
FIG. 44 is a flow chart for explaining the operation of reporting unit 14.

Upon acquiring a report, which indicates that the switching of IOP 20*n* has failed and the recovery therefore is unsuccessful, from DGP 1000 after the occurrence of a fault, reporting unit 14 reports this information to the software (see FIG. 44).

FW 100-2 further includes the software that prescribes the operation of reporting unit 14.

Upon acquiring a report, which indicates that IOP 20*n* in which the fault occurred has been exchanged for a new IOP 20*n*, from DGP 1000, reporting unit 15 reports this information to the software. FW 100-2 further includes the software that prescribes the operation of reporting unit 15.

Cut-off unit 16 cuts off CH 300*n* that has been designated by the instructions of the software. FW 100-2 further includes the software that prescribes the operation of cut-off unit 16.

Incorporation unit 17 incorporates CH 300*n* that has been designated by the instructions of the software. FW 100-2 further includes the software that prescribes the operation of incorporation unit 17.

Figures 6, 7, 8:
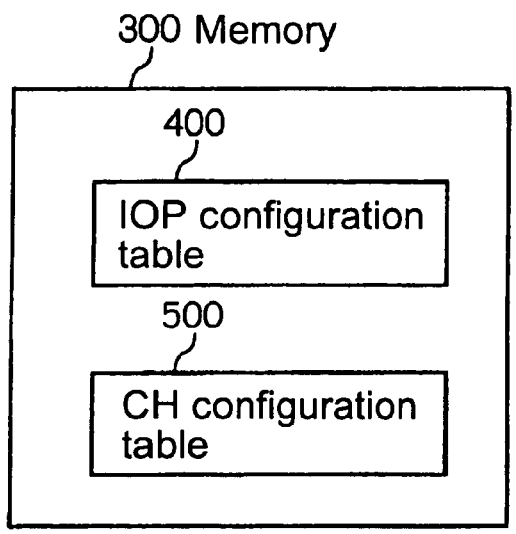
FIG. 6 is a block diagram showing an example of memory 30*n* that is included in CELL.
FIG. 7 is an explanatory view showing an example of IOP configuration table 400.
FIG. 8 is an explanatory view showing an example of CH configuration table 500.

FIG. 6 is a block diagram showing an example of memory 30*n* that is included in CELL. Each of memory 30*n* is of the same configuration, and memory 300 is therefore shown in FIG. 6 as an example of memory 30*n*.

In FIG. 6, memory 300 includes IOP configuration table 400 and CH configuration table 500.

IOP configuration table 400 stores information indicating the CH that are controlled by each IOP 20*n*.

FIG. 7 is an explanatory view showing an example of IOP configuration table 400.

In FIG. 7, IOP configuration table 400 has two input spaces for each of IOP 200-207. These input spaces are arranged in the order of the IOP numbers (IOP0-IOP7), which are the identifiers of IOP 200-207).

The IOP numbers of IOP 200-207 are stored in each input space. In these input spaces, each IOP number is placed in correspondence with current state information that indicates the current state of IOP 20*n* of that IOP number.

When IOP 20*n* controls CH 300*n*, the CH number (any of CH0 to CH7) that is the identifier of CH 300*n* is used as the current-state information of IOP 20*n*.

When IOP 20*n* is not currently controlling any of CH 3000 to 3007 but is capable of controlling CH 3000, 3001, 3002, 3003, 3004, 3005, 3006, or 3007, "available" is used as the current-state information of IOP 20*n*.

In addition, when IOP 20*n* is defined as "spare" and thus currently unable to control any of CH 3000 to 3007, "spare" is used as the current-state information of IOP 20*n*.

When IOP 20*n* is unable to control any of CH 3000 to 3007 due to a fault, "unavailable" is used as the current-state information of IOP 20*n*.

Returning to FIG. 6, CH configuration table 500 stores information that indicates the IOPs that control CH 3000 to 3007.

FIG. 8 is an explanatory view showing an example of CH configuration table 500.

In FIG. 8, CH configuration table 500 has one input space for each of CH 3000-3007. These input spaces are arranged in the order of the CH numbers of CH 3000-3007.

The CH number of CH 3000-3007 is stored in each input space. Each CH number is placed in correspondence with the current-state information that indicates the current state of CH 300*n* of that CH number.

When CH 300*n* is controlled by IOP 20*n*, the IOP number of IOP 20*n* is used as the current-state information of CH 300*n*.

When CH 300*n* cannot be used, "unavailable" is used as the current-state information of CH 300*n*.

Returning to FIG. 3, DGP 1000 performs both the activation and halt of information processor 1A, as well as the correspondence relation control and fault processing of each device.

FIG. 9 is a block diagram showing an example of DGP 1000.

In FIG. 9, DGP 1000 includes processor 1001, FW (firmware) 1002 and LM (local memory) 1003.

FW 1002 performs the activation and halt of information processor 1A as well as the correspondence relation control and fault processing of each device.

Processor 1001 performs processing in accordance with the instructions of FW 1002.

LM 1003 stores the configuration information of information processor 1A. LM 1003 further stores information when each process is being carried out.

FIG. 10 is an explanatory view showing an example of LM 1003.

In FIG. 10, LM 1003 stores IOP configuration information 1004 and CH configuration information 1005.

IOP configuration information 1004 shows the state of IOP 200 to 207 when information processor 1A is activated.

FIG. 11 is an explanatory view showing an example of IOP configuration information 1004.

IOP configuration information 1004 has one input space for each of IOP 200-207. These input spaces are arranged in the order of IOP numbers (IOP0-IOP7).

The IOP numbers of IOP 200-207 are stored in each input space. In these input spaces, each IOP number is placed in correspondence with activation state information that indicates the state of IOP 20*n* of that IOP number when information processor 1A is activated.

When IOP 20*n* is "available" at the time of activation of information processor 1A, "available" is used as the activation state information of IOP 20*n*.

When IOP 20*n* is spare at the time of activation of information processor 1A, "spare" is used as the activation state information of IOP 20*n*.

If IOP 20*n* cannot be used at the time of activation of information processor 1A, "unavailable" is used as the activation state information of IOP 20*n*.

Returning to FIG. 10, CH configuration information 1005 shows the state of CH 3000 to 3007 at the time of activation of information processor 1A.

Figures 12, 13:
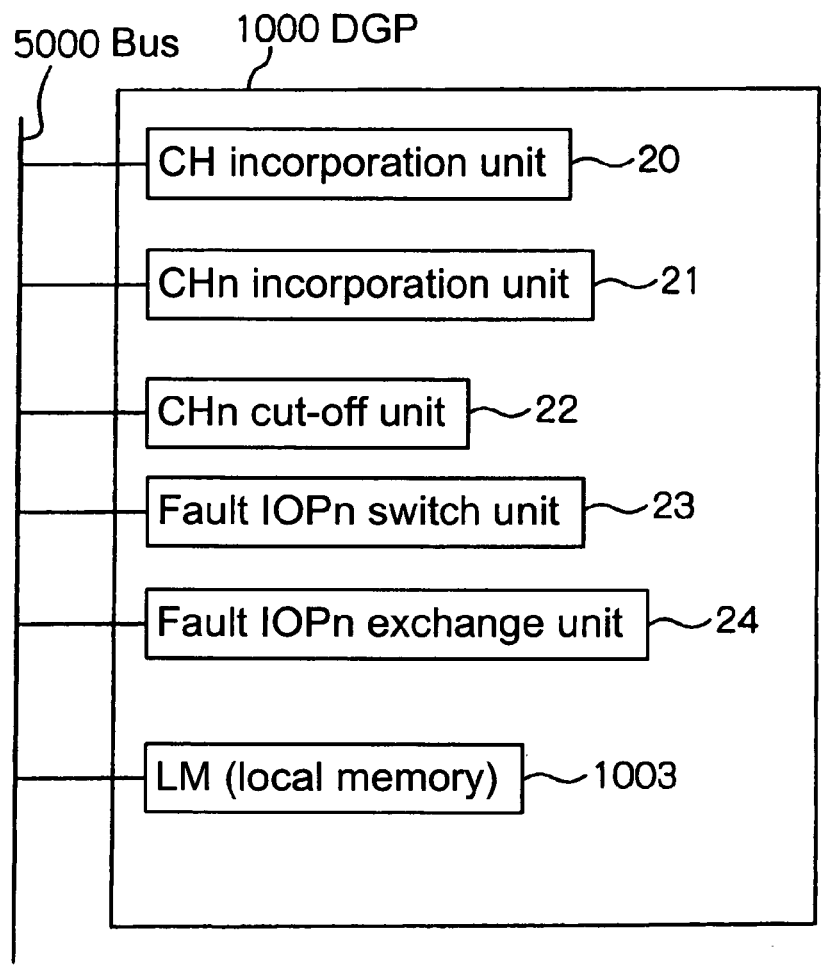
FIG. 12 is an explanatory view showing an example of CH configuration information 1005.
FIG. 13 is a function block diagram showing the functions possessed by DGP 1000.

FIG. 12 is an explanatory view showing an example of CH configuration information 1005.

CH configuration information 1005 has one input space for each of CH 3000-3007. These input spaces are arranged in the order of CH numbers (CH0 to CH7).

CH numbers of CH 3000-3007 are stored in each input space. In these input spaces, each CH number is placed in correspondence with activation state information indicating the state of CH 300*n* of the relevant CH number at the time that information processor 1A is activated.

When CH 300*n* is available at the time of activation of information processor 1A, "available" is used as the activation state information of CH 300*n*.

If CH 300*n* cannot be used at the time of activation of information processor 1A, "unavailable" is used as the activation state information of CH 300*n*.

IOP configuration information 1004 and CH configuration information 1005 are set in accordance with the configuration of information processor 1A. IOP configuration information 1004 and CH configuration information 1005 are set by means of switches that are provided in DGP 1000.

FIG. 13 is a function block diagram showing the functions possessed by DGP 1000.

In FIG. 13, DGP 1000 includes: CH incorporation unit (hereinbelow referred to as simply "incorporation unit") 20; CHn incorporation unit (hereinbelow referred to as simply "incorporation unit") 21; CHn cut-off unit (hereinbelow referred to as simply "cut-off unit") 22; fault IOPn switch unit (hereinbelow referred to as simply "switch unit") 23; fault IOPn exchange unit (hereinbelow referred to as simply "exchange unit") 24; and LM (local memory) 1003.

By executing FW 1002, processor 1001 realizes incorporation unit 20, incorporation unit 21, cut-off unit 22, switch unit 23, and exchange unit 24.

When information processor 1A is activated, incorporation unit 20 makes IOP 200-207 and CH 3000-3007 "available" in accordance with IOP configuration information 1004 and CH configuration information 1005.

In addition, when information processor 1A is activated, incorporation unit 20 places IOP 200-207 in correspondence with CH 3000-3007 in accordance with IOP configuration information 1004 and CH configuration information 1005.

When information processor 1A is activated, incorporation unit 20 further creates a state in which EPU 10x is able to use IOP 200-207 and CH 3000-3007 in accordance with IOP configuration information 1004 and CH configuration information 1005. FW 1002 further includes the software that prescribes the operation of incorporation unit 20.

Incorporation unit 21, by placing IOP 200-207 and CH 3000-3007 in correspondence based on the instructions of EPU 10x, creates a state in which EPU 10x is able to use PU 4000-4007. In addition, FW 1002 includes the software that prescribes the operation of incorporation unit 21.

Cut-off unit 22 creates a state in which EPU 10x cannot use PU 4000-4007 by canceling the correspondence relation of IOP 200-207 and CH 3000-3007 based on the instructions of EPU 10x. In addition, FW 1002 includes software that prescribes the operation of cut-off unit 22.

Switch unit 23 cancels the correspondence relation of IOP 20n and CH 300n when a fault of IOP 20n occurs. Switch unit 23 further reports the occurrence of a fault in CH 300n, which corresponds to IOP 20n in which the fault occurred, to EPU 100-123.

By placing IOP 20m, which has a SLOT that can be used because it is spare or unused, in correspondence with CH 300n, which corresponded to IOP 20n in which a fault has occurred, switch unit 23 creates a state in which EPU 10x can continuously use PU 4000 to 4007. Then switch unit 23 reports success of the fault recovery to EPU 10x.

FW 1002 includes software that prescribes the operation of switch unit 23.

When IOP 20n, in which a fault occurred, has been exchanged for a new IOP, exchange unit 24 makes the new IOP 20n available and then sends an exchange completion report to EPU 10x.

Returning to FIG. 3, based on the instructions of EPU 10x, IOP 20n controls CH 300n with which it has been placed in correspondence by DGP 1000 to perform data transfer between memory 30n and PU 400n that is connected to CH 300n.

The data transfer between PU 4000 to 4007 and memory 300 to 307 is carried out by way of IOP 200 to 207.

Figure 14:
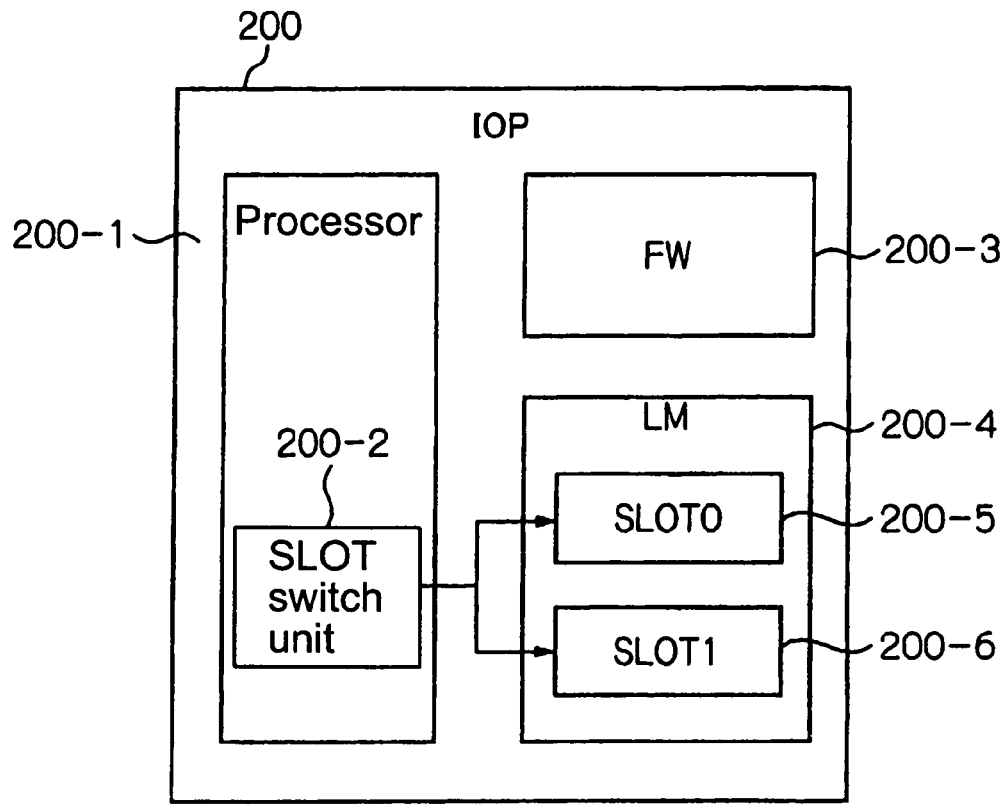
FIG. 14 is a block diagram showing an example of IOP 20*n*.

FIG. 14 is a block diagram showing an example of IOP 20n. Each of IOP 20n is of identical configuration, and IOP 200 is therefore shown in FIG. 14 as an example of IOP 20n.

In FIG. 14, IOP 200 includes processor 200-1, FW 200-3, and LM 200-4.

FW 200-3 carries out processing in accordance with the instructions of EPU 10x or DGP 1000.

Processor 200-1 carries out processing in accordance with the instructions of FW 200-3.

LM 200-4 stores information that is required when FW 200-3 and processor 200-1 perform data transfer by controlling CH 300n.

LM 200-4 includes SLOT 200-5 and 200-6. Each SLOT stores information that is necessary for performing data transfer by controlling one CH 300n.

In addition, each of SLOT 200-5 and 200-6 stores information that indicates whether SLOT 200-5 or 200-6 is unused or being used by CH 300n.

FW 200-3 reads this stored information. Based on this information, FW 200-3 determines whether each slot is unused or being used by CH 300n. In addition, FW 200-3 is able to read and write to each SLOT 200-5 and 200-6.

Processor 200-1 includes SLOT switch unit 200-2.

SLOT switch unit 200-2 selects the information in SLOT 200-5 or the information in SLOT 200-6 as information for controlling CH 300n.

More specifically, under the control of FW 200-3, SLOT switch unit 200-2 selects the information of SLOT 200-5 or SLOT 200-6 as information for data transfer.

By means of these functions, each IOP 20n is able to simultaneously control two CH 300n to perform data transfer.

Figure 15:
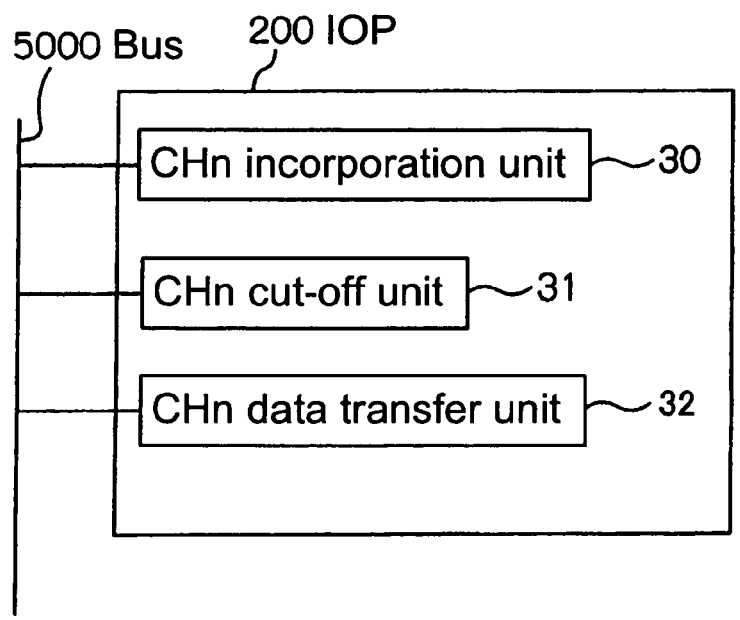
FIG. 15 is a function block diagram showing the functions possessed by IOP 200.

FIG. 15 is a function block diagram showing the functions possessed by IOP 200.

In FIG. 15, IOP 200 includes: CHn incorporation unit (hereinbelow referred to as simply "incorporation unit") 30; CHn cut-off unit (hereinbelow referred to as simply "cut-off unit") 31; and CHn data transfer unit (hereinbelow, referred to as simply "data transfer unit") 32. Processor 200-1 realizes incorporation unit 30, cut-off unit 31, and data transfer unit 32 by executing FW 200-3.

Upon receiving the instructions of DGP 1000 or EPU 10x, incorporation unit 30 sets CH 300n, which is designated by these instructions, to enable data transfer in order to create a state in which EPU 10x can use PU 4000 to 4007. In addition, FW 200-3 includes software that prescribes the operation of incorporation unit 30.

Upon receiving the instructions of DGP 1000 or EPU 10x, cut-off unit 31 halts the operation of CH 300n to create a state in which EPU 10x cannot use PU 400n.

Upon receiving the instructions of EPU 10x, data transfer unit 32 uses CH 300n, which is designated by these instructions, to perform data transfer.

Explanation next regards an outline of the operation.

When a fault occurs in IOP 20n that controls CH 300n, DGP 1000 detects the occurrence of the fault in IOP 20n.

Upon detecting the occurrence of the fault, DGP 1000 causes switch unit 23 to operate.

Switch unit 23 causes either spare IOP 20n+1 or IOP 20n+1, which can control CH 300n, to control CH 300n.

Switch unit 23 then transmits to EPU 10x a fault occurrence report of CH 300n indicating that a fault has occurred in CH 300n and a recovery report of CH 300n indicating the recovery from the fault.

Switch unit 23 further stores information, which indicates IOP 20n+1 controls CH 300n, in CH configuration table 500. EPU 10x checks the information that has been stored in CH configuration table 500.

Upon receiving the fault occurrence report of CH 300n and the report of its recovery, EPU 10x causes reporting unit 12 and reporting unit 13 to operate.

Reporting unit 12 reports the occurrence of a fault of CH 300n to the software, and reporting unit 13 further reports the recovery of CH 300n to the software.

After reporting the recovery to the software and upon receiving data transfer instructions that designate CH 300n from the software, EPU 10x causes instruction unit 10 to operate.

Instruction unit 10 refers to CH configuration table 500 in order to verify that IOP 20n+1 controls CH 300n.

Instruction unit 10 then provides data transfer instructions to IOP 20n+1 that controls CH 300n.

Thus, in spite of the occurrence of a fault in IOP 20n that controls CH 300n, IOP 20n+1 controls CH 300n in place of IOP 20n, whereby data transfer by way of CH 300n can be continued. In this way, the halts of the operation or drops in the performance of the information processor can be prevented.

When IOP 20n in which a fault occurred is exchanged for new IOP 20n, DGP 1000 causes exchange unit 24 to operate.

Exchange unit 24 causes new IOP 20n to control CH 300n. Exchange unit 24 then transmits an exchange completion report, which indicates the completion of exchange of CH 300n, to EPU 10x.

Upon receiving this report, EPU 10x causes reporting unit 15 to operate. Reporting unit 15 provides an exchange completion report to the software.

By means of this report, the software recognizes that IOP 20n in which a fault has occurred has been exchanged.

Having recognized that IOP 20n has been exchanged, the software instructs the cut-off of CH 300n to EPU 10x, and then instructs the incorporation of CH 300n.

Thus, based on the instructions of the software, IOP 20n is again able to control CH 300n.

Conventionally, maintenance personnel, after exchanging IOP 20n in which a fault has occurred for new IOP 20n, incorporate the new IOP 20n into the information processor. As an inevitable consequence, the possibility existed for stoppage of the information processor due to human error, but the present embodiment is able to decrease the potential for halts of the information processor that result from human error.

Explanation next regards a concrete example of the operation.

Explanation first regards operation when IOP configuration information 1004 and CH configuration information 1005 are set as shown in FIGS. 16 and 17 when information processor 1A is activated.

In IOP configuration information 1004, all IOP 20n are set to "available," and in CH configuration information 1005, all CH 3000-3007 are set to "available."

When information processor 1A is activated in this state, incorporation unit 20 of DGP 1000 begins operation.

Figure 18:
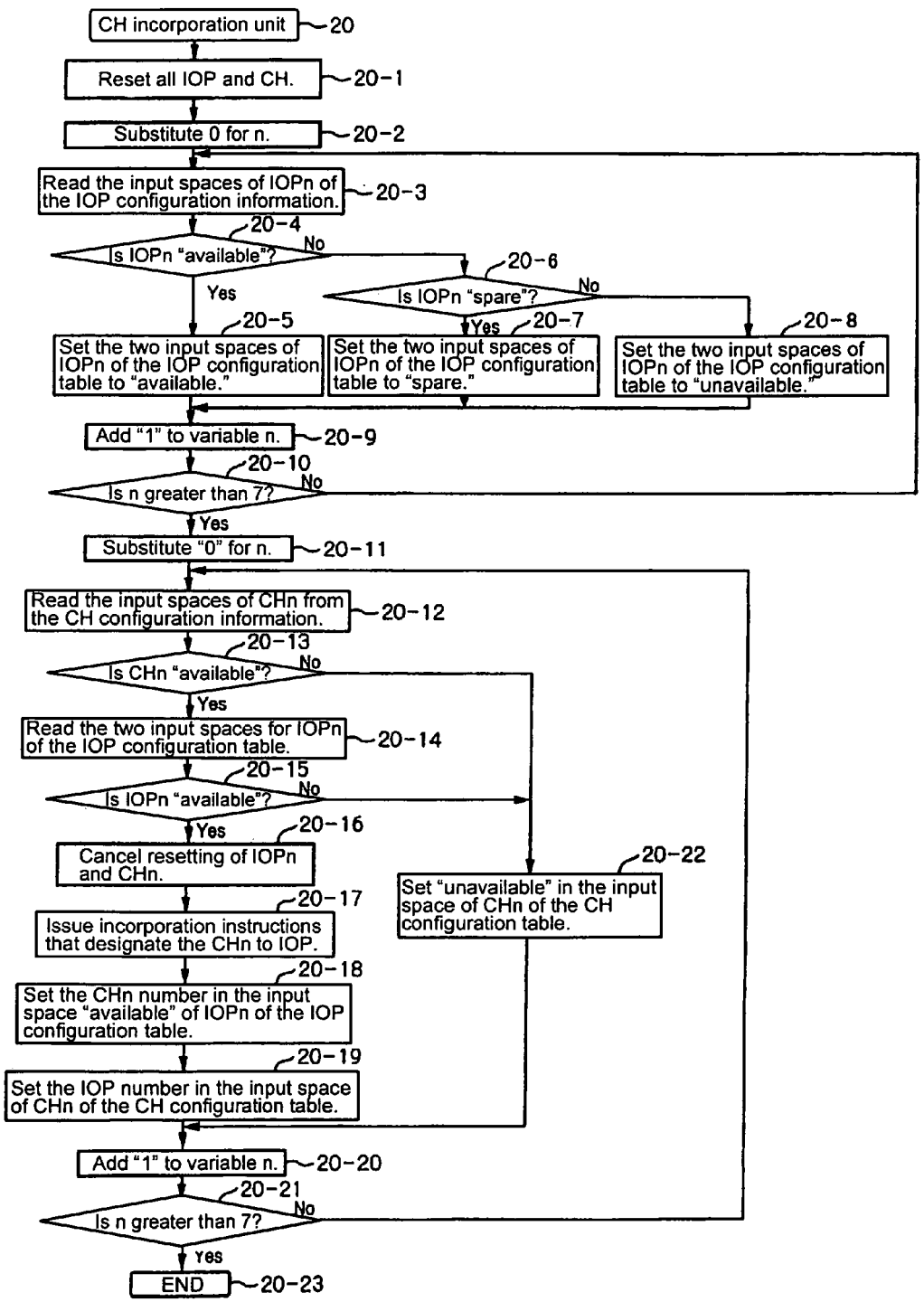
FIG. 18 is a flow chart for explaining the operation of incorporation unit 20.

FIG. 18 is a flow chart for explaining the operation of incorporation unit 20. Explanation next regards the operation of incorporation unit 20 while referring to FIG. 18.

When information processor 1A is activated, incorporation unit 20 executes Step 20-1.

In Step 20-1, incorporation unit 20 resets all IOP 20n and all CH 300n. Upon completing Step 20-1, incorporation unit 20 executes Step 20-2.

In Step 20-2, incorporation unit 20 substitutes 0 for variable n. Upon completion of Step 20-2, incorporation unit executes Step 20-3.

In Step 20-3, incorporation unit 20 reads the information in the input spaces of IOP n of IOP configuration information 1004. Upon completing Step 20-3, incorporation unit 20 executes Step 20-4.

In Step 20-4, incorporation unit 20 determines whether this information is "available." If this information is "available," incorporation unit 20 executes Step 20-5, but if this information is not "available," incorporation unit 20 executes Step 20-6.

In Step 20-6, incorporation unit 20 determines whether the information is "spare." If the information is "spare," incorporation unit 20 executes Step 20-7, but if the information is not "spare," incorporation unit 20 executes Step 20-8.

In Step 20-5, incorporation unit 20 writes "available" in the two input spaces of IOP n of IOP configuration table 400 (see FIG. 7) in each memory 30n in CELL 2000-2007. Upon completing Step 20-5, incorporation unit executes Step 20-9.

In Step 20-7, on the other hand, incorporation unit 20 writes "spare" in the two input spaces of IOP n of IOP configuration table 400 in each memory 30n of CELL 2000-2007. Upon completing Step 20-7, incorporation unit 20 executes Step 20-9.

In Step 20-8, on the other hand, incorporation unit 20 writes "unavailable" in the two input spaces of IOP n of IOP configuration table 400 in each memory 30n in CELL 2000-2007. Upon completing Step 20-8, incorporation unit 20 executes Step 20-9.

In Step 20-9, incorporation unit 20 adds "1" to variable n. Upon completing Step 20-9, incorporation unit 20 executes Step 20-10.

In Step 20-10, incorporation unit 20 determines whether variable n is greater than 7. If variable n is not greater than 7, incorporation unit 20 executes Step 20-3, and executes Step 20-11 if variable n is greater than 7.

In the present example, all IOP configuration information 1004 is set to "available," and as a result, "available" is written in the two input spaces of each of IOP 200-207 of IOP configuration table 400.

In Step 20-11, incorporation unit 20 substitutes 0 for variable n. Upon completing Step 20-11, incorporation unit 20 executes Step 20-12.

In Step 20-12, incorporation unit 20 reads the information in the CHn input space of CH configuration information 1005 in DGP 1000. Upon completing Step 20-12, incorporation unit executes Step 20-13.

In Step 20-13, incorporation unit 20 determines whether this information is "available." If the information is "available," incorporation unit 20 executes Step 20-14, and if the information is not "available," incorporation unit 20 executes Step 20-22.

In Step 20-14, incorporation unit 20 reads the state of IOP 20n having the same number n as CH 300n from the two input spaces of IOP 20n (IOP n) in IOP configuration table 400. Upon completing Step 20-14, incorporation unit 20 executes Step 20-15.

In Step 20-15, incorporation unit 20 determines whether at least one of the two states of IOP 20n is "available" or not. If at least one is "available," incorporation unit 20 executes Step 20-16, and if both are "unavailable," incorporation unit 20 executes Step 20-22.

In Step 20-16, incorporation unit 20 cancels the resetting of IOP 20n and CH 300n. Upon completing Step 20-16, incorporation unit 20 executes Step 20-17.

In Step 20-17, incorporation unit 20 delivers incorporation instructions designating CH 300n to IOP 20n. Upon completing Step 20-17, incorporation unit 20 executes Step 20-18.

In Step 20-18, incorporation unit 20 sets the CH number (CHn) of CH 300n to one input space of IOP 20n in IOP configuration table 400. Upon completing Step 20-18, incorporation unit 20 executes Step 20-19.

In Step 20-19, incorporation unit 20 sets the IOP number (IOPn) of IOP 20n in the input space of CH 300n of CH configuration table 500. Upon completing Step 20-19, incorporation unit 20 executes Step 20-20.

In Step 20-20, incorporation unit 20 adds "1" to variable n. Upon completing Step 20-20, incorporation unit 20 executes Step 20-21.

In Step 20-21, incorporation unit 20 determines whether variable n is greater than 7 or not. If variable n is not greater than 7, incorporation unit 20 executes Step 20-12, but if variable n is greater than 7, incorporation unit 20 executes Step 20-23.

In Step 20-23, incorporation unit ends the operation.

In Step 20-22, on the other hand, incorporation unit 20 writes "unavailable" into the input space of CH 300n of CH configuration table 500. Upon completing Step 20-22, incorporation unit 20 executes Step 20-20.

In the present example, all CH configuration information 1005 is set to "available," and IOP configuration table 400 is therefore as shown in FIG. 19 and CH configuration table 500 is as shown in FIG. 20.

When incorporation instructions that designate CH 300n are provided to IOP 20n by means of the operation of incorporation unit 20 of DGP 1000, incorporation unit 30 operates in IOP 20n.

Figure 21:
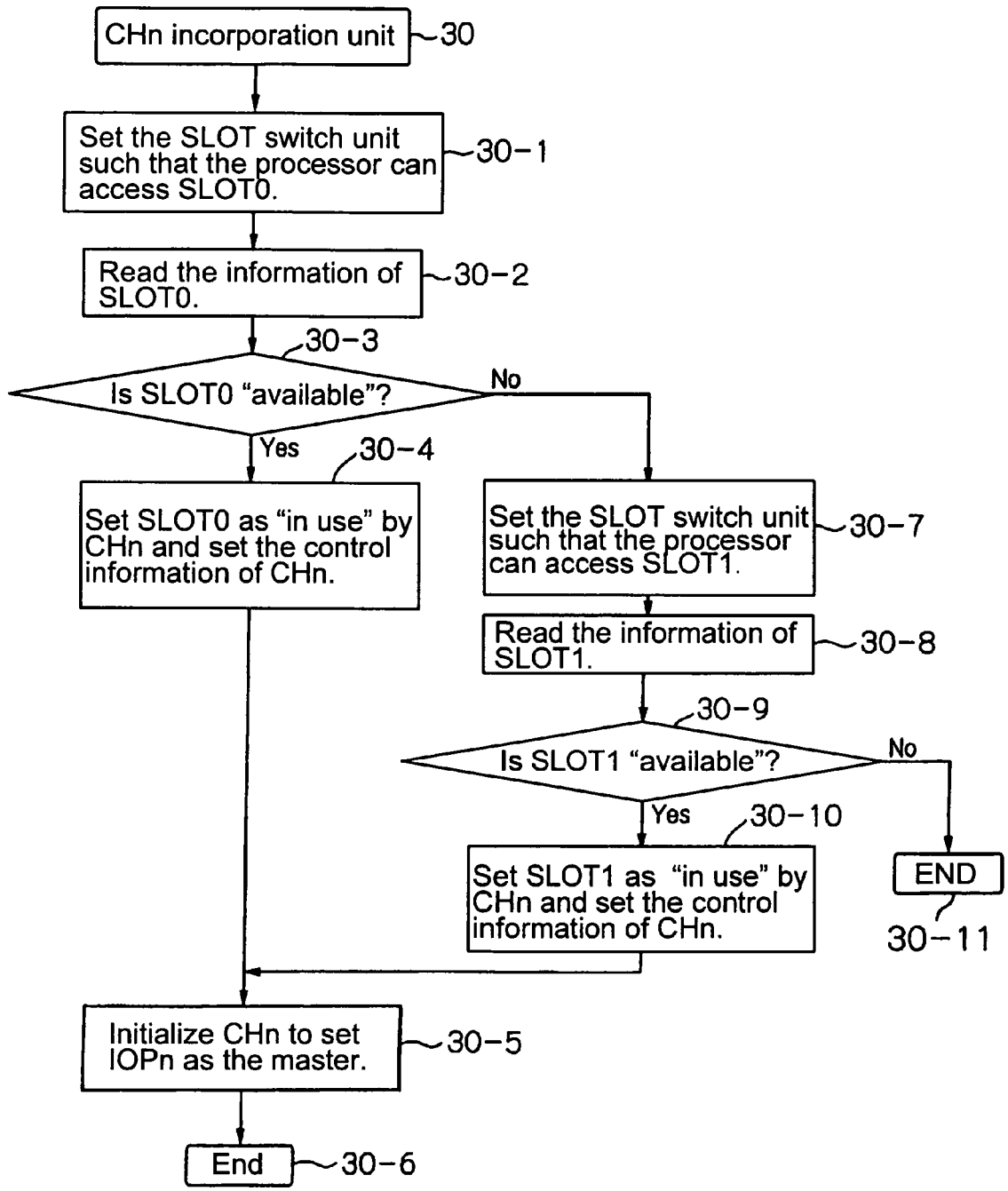
FIG. 21 is a flow chart for explaining the operation of incorporation unit 30.

FIG. 21 is a flow chart for explaining the operation of incorporation unit 30. In the following explanation, the operation of incorporation unit 30 is explained while referring to FIG. 21.

When IOP 20n (see FIG. 14) receives incorporation instructions that designate CH 300n, incorporation unit 30 executes Step 30-1.

In Step 30-1, incorporation unit 30 sets SLOT switch unit 20n-2 such that processor 20n-2 can access SLOT020n-5. Upon completing Step 30-1, incorporation unit 30 executes Step 30-2.

In Step 30-2, incorporation unit 30 reads the information of SLOT020n-5. Upon completing Step 30-2, incorporation unit 30 executes Step 30-3.

In Step 30-3, incorporation unit 30 verifies based on the information whether SLOT020n-5 can be used due to non-use. If SLOT020n-5 is available, incorporation unit 30 executes Step 30-4, but if SLOT020n-5 is not available, incorporation unit 30 executes Step 30-7.

In Step 30-4, incorporation unit 30 makes settings in SLOT020n-5 in order to indicate that SLOT020n-5 is "in use" by CH 300n that has been designated by incorporation instructions, and further, sets the control information of CH 300n in SLOT020n-5. Upon completing Step 304, incorporation unit 30 executes Step 30-5.

In Step 30-5, incorporation unit 30 initializes CH 300n and then sets correspondence between IOP 20n and CH 300n in CH 300n. Upon completing Step 30-5, incorporation unit 30 executes Step 30-6.

In Step 30-6, incorporation unit 30 ends the operation.

In Step 30-7, incorporation unit 30 sets SLOT switch unit 20n-2 such that processor 20n-1 can access SLOT120n-6. Upon completing Step 30-7, incorporation unit 30 executes Step 30-8.

In Step 30-8, incorporation unit 30 reads the information of SLOT120n-6. Upon completing Step 30-8, incorporation unit 30 executes Step 30-9.

In Step 30-9, incorporation unit 30, based on this information, verifies whether SLOT120n-6 is available due to non-use. If SLOT120n-6 is available, incorporation unit 30 executes Step 30-10, but if SLOT120n-6 is not available, incorporation unit 30 executes Step 30-11.

In Step 30-10, incorporation unit 30 makes settings in SLOT120n-6 in order to indicate that SLOT120n-6 is in use by CH 300n that has been designated by incorporation instructions, and further, sets the control information of CH 300n in SLOT120n-6. Upon completing Step 30-10, incorporation unit 30 executes Step 30-5.

In Step 30-11, incorporation unit 30 ends the operation.

In the present example, the information that was read in Step 30-2 indicates that SLOT020n-5 is unused, and as a result, the control information of CH 300n that is designated by incorporation instructions is set in SLOT020n-5, and information, which indicates that SLOT020n-5 is in use by CH 300n, is set in SLOT020n-5. At this time, SLOT120n-6 of IOP 20n is available due to non-use.

The operations of incorporation unit 20 of DGP 1000 and incorporation unit 30 of IOP 200 place IOP 20n in correspondence with CH 300n.

When IOP 20n corresponds to CH 300n, IOP 20n and CH 300n can be used by EPU 10x. In this state, EPU 10x can, in accordance with the instructions of the software, supply data transfer instructions that designate CH 300n to IOP 20n.

Explanation next regards the operation when EPU 100, in accordance with the instructions of the software, supplies data transfer instructions that designate CH 3000 to IOP 200.

Instruction unit 10 of EPU 100 first begins operation under the instructions of the software.

Figure 22:
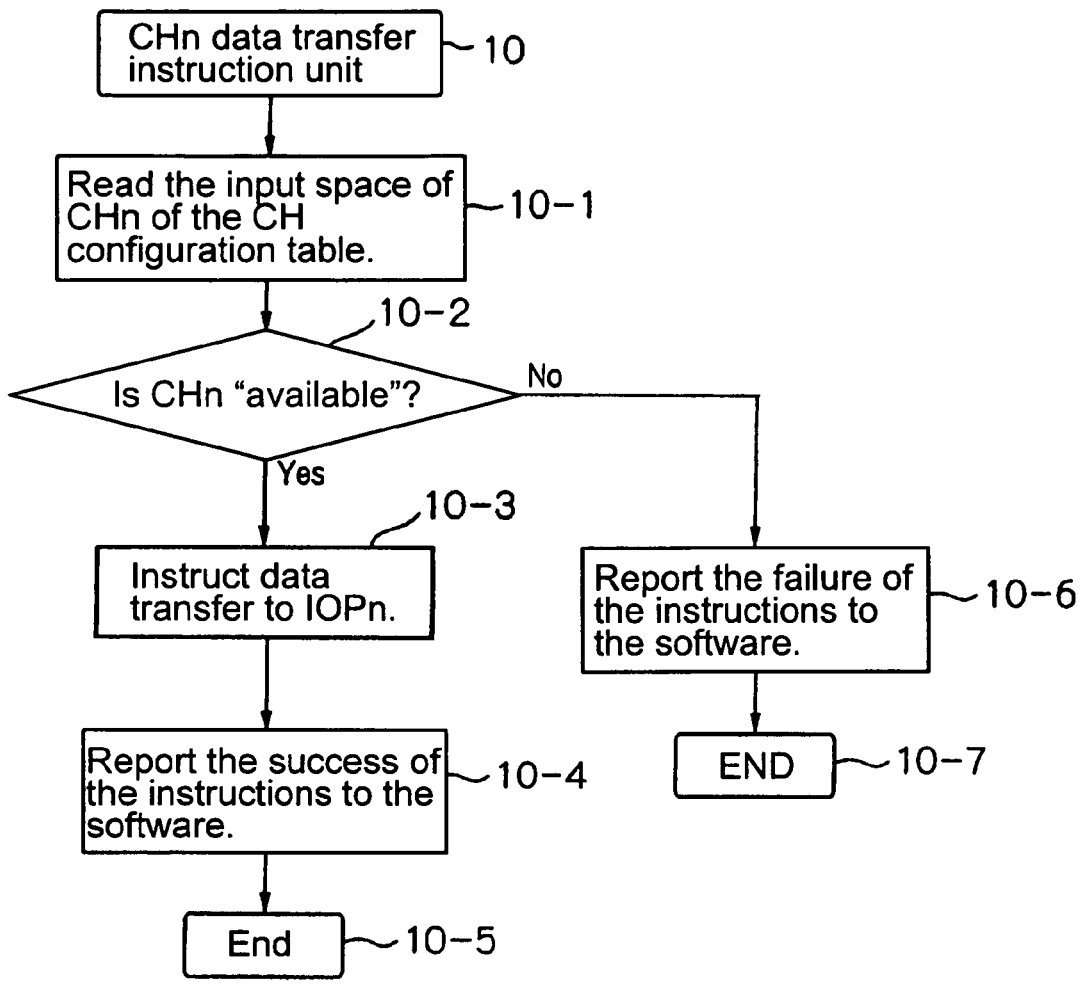
FIG. 22 is a flow chart for explaining the operation of instruction unit 10.

FIG. 22 is a flow chart for explaining the operation of instruction unit 10. The operation of instruction unit 10 is next described while referring to FIG. 22.

Upon starting operation, instruction unit 10 executes Step 10-1.

In Step 10-1, instruction unit 10 specifies, from CH configuration table 500, the input spaces that correspond to CH 3000 that has been instructed by the software, and reads the information in these input spaces. Upon completing Step 10-1, instruction unit 10 executes Step 10-2.

In Step 10-2, instruction unit 10 verifies whether the IOP number of IOP 200 that corresponds to CH 3000 is noted in this information.

If the IOP number of IOP 200 is noted in this information, CH 3000 can be used, but if the IOP number of IOP 200 is not noted in this information, CH 3000 cannot be used.

When CH 3000 can be used, instruction unit 10 executes Step 10-3, but when CH 3000 cannot be used, instruction unit 10 executes Step 10-6.

In Step 10-3, instruction unit 10 supplies data transfer instructions that designate CH 3000 to IOP 200. Upon completing Step 10-3, instruction unit 10 executes Step 10-4.

In Step 10-4, instruction unit 10 reports the success of the instructions to the software. Upon completing Step 10-4, instruction unit 10 executes Step 10-5.

In Step 10-5, instruction unit 10 ends the operation.

In Step 10-6, on the other hand, instruction unit 10 reports the failure of the instructions to the software. Upon completing Step 10-6, instruction unit 10 executes Step 10-7.

In Step 10-7, instruction unit 10 ends the operation.

In the present example, the IOP number of IOP 200 is stored in the input space of CH 3000 of CH configuration table 500 and CH 3000 is therefore available, whereby instruction unit 10 instructs data transfer that designates CH 3000 to IOP 200 and then reports the success of the instructions to the software.

After receiving the report of the success of instructions, the software waits for a report of the completion of data transfer. The report of the completion of data transfer is supplied from EPU 100.

EPU 100, on the other hand, waits for a report of the completion of data transfer. The report of the completion of data transfer is supplied from IOP 200. When EPU 100 receives the report of the completion of data transfer, reporting unit 11 begins operation.

Figure 23:
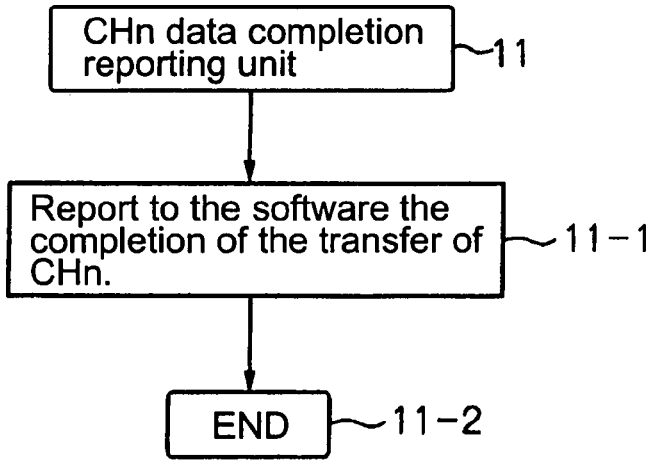
FIG. 23 is a flow chart for explaining the operation of reporting unit 11.

FIG. 23 is a flow chart for explaining the operation of reporting unit 11. Explanation next regards the operation of reporting unit 11 while referring to FIG. 23.

Upon starting operation, reporting unit 11 executes Step 11-1.

In Step 11-1, reporting unit 11 reports the completion of transfer of CH 3000 to the software. Upon completing Step 11-1, reporting unit 11 executes Step 11-2.

In Step 11-2, reporting unit 11 ends the operation.

On the other hand, IOP 200, upon receiving data transfer instructions, which designate CH 3000, from EPU 100, causes data transfer unit 32 to operate.

Figure 24:
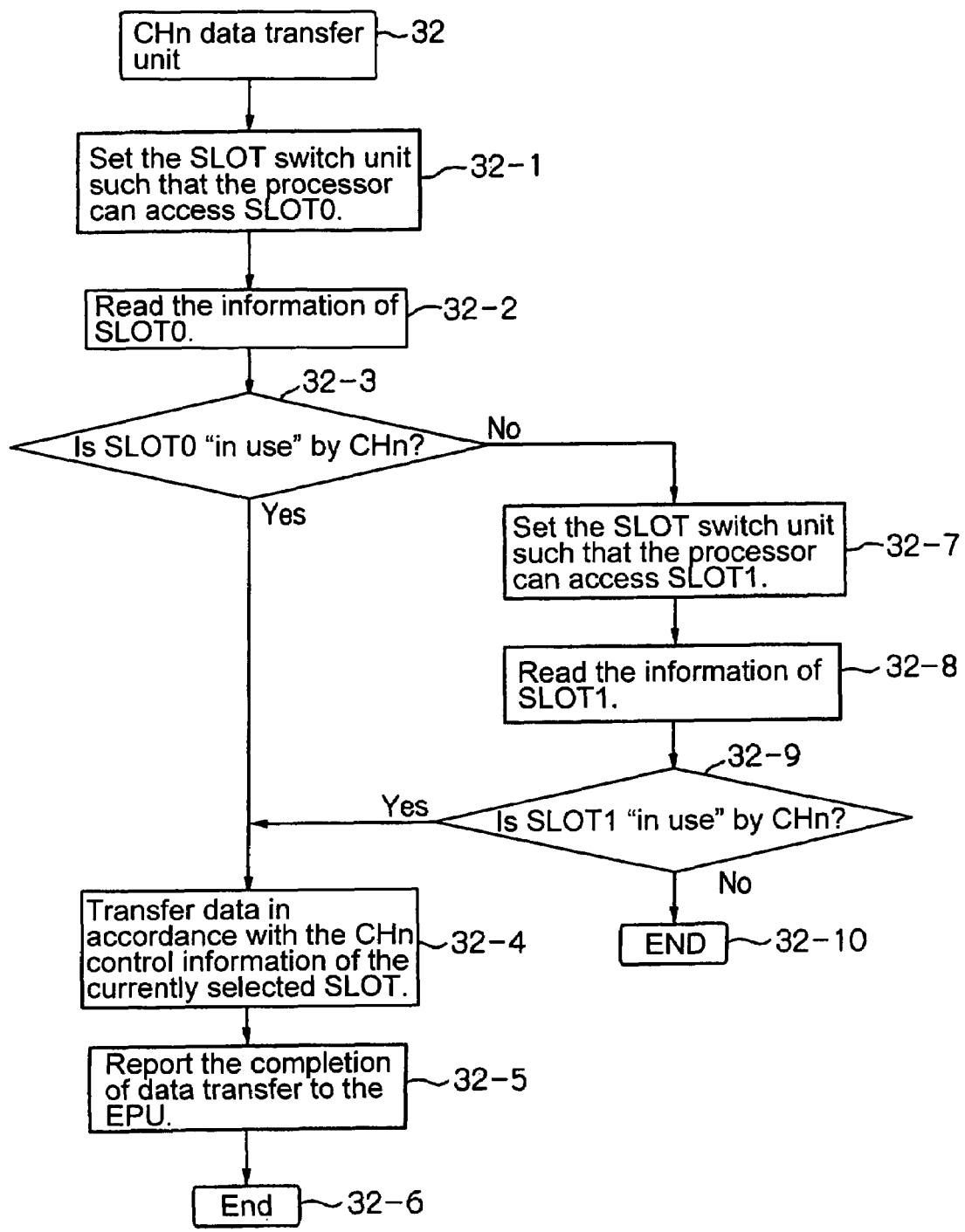
FIG. 24 is a flow chart for explaining the operation of data transfer unit 32.

FIG. 24 is a flow chart for explaining the operation of data transfer unit 32. Explanation next regards the operation of data transfer unit 32 with reference to FIG. 24.

Upon starting operation, data transfer unit 32 executes Step 32-1.

In Step 32-1, data transfer unit 32 sets SLOT switch unit 20*n*-2 such that processor 20*n*-1 can access SLOT 020*n*-5. Upon completing Step 32-1, data transfer unit 32 executes Step 32-2.

In Step 32-2, data transfer unit 32 reads the information from SLOT 020*n*-5. Upon completing Step 32-2, data transfer unit 32 executes Step 32-3.

In Step 32-3, data transfer unit 32 verifies whether the information indicates that SLOT 020*n*-5 is in use at CH 300*n*.

If the information indicates that SLOT 020*n*-5 is in use at CH 300*n*, data transfer unit 32 executes Step 32-4, but if the information indicates that SLOT 020*n*-5 is not in use at CH 300*n*, data transfer unit 32 executes Step 32-7.

In Step 32-4, data transfer unit 32 performs data transfer by controlling CH 300*n* based on the information of CH 300*n* that is stored in SLOT 020*n*-5. Upon completing Step 32-4, data transfer unit 32 executes Step 32-5.

In Step 32-5, data transfer unit 32 reports the completion of data transfer to EPU 100. Upon completing Step 32-5, data transfer unit 32 executes Step 32-6.

In Step 32-6, data transfer unit 32 ends the operation.

In Step 32-7, on the other hand, data transfer unit 32 sets SLOT switch unit 20*n*-2 such that processor 20*n*-1 can access SLOT 120*n*-6. Upon completing Step 32-7, data transfer unit 32 executes Step 32-8.

In Step 32-8, data transfer unit 32 reads information from SLOT 120*n*-6. Upon completing Step 32-8, data transfer unit 32 executes Step 32-9.

In Step 32-9, data transfer unit 32 verifies whether this information indicates that SLOT 120*n*-6 is in use at CH 300*n*.

If this information indicates that SLOT 120*n*-6 is in use at CH 300*n*, data transfer unit 32 executes Step 32-4, but if this information does not indicate that SLOT 120*n*-6 is in use at CH 300*n*, data transfer unit 32 executes Step 32-10.

In Step 32-10, data transfer unit 32 ends the operation.

In the present example, the information of CH 3000, and further, the information that is in use at CH 3000 are stored in SLOT 020*n*-5, and data transfer unit 32 therefore performs data transfer by controlling CH 3000 based on this information and reports the completion of data transfer to EPU 100.

Explanation next regards the operations for a case in which EPU 100, based on the instructions of the software, delivers data transfer instructions that designate CH 3000 to IOP 200, and a fault occurs in IOP 200.

When a fault occurs in IOP 200, switch unit 23 of DGP 1000 begins operation.

Figure 25:
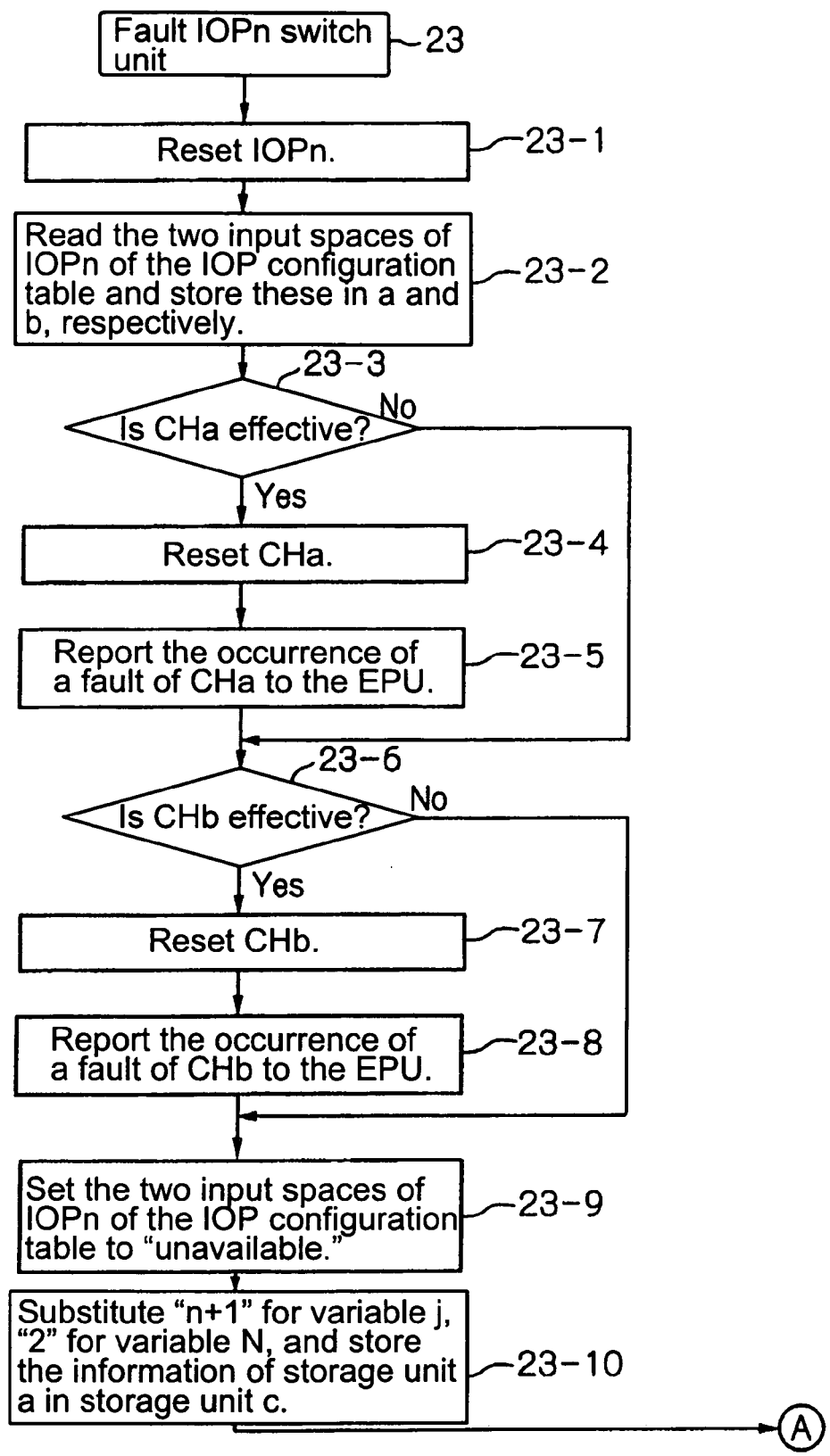
FIG. 25 is a flow chart for explaining the operation of switch unit 23.
Figure 26:
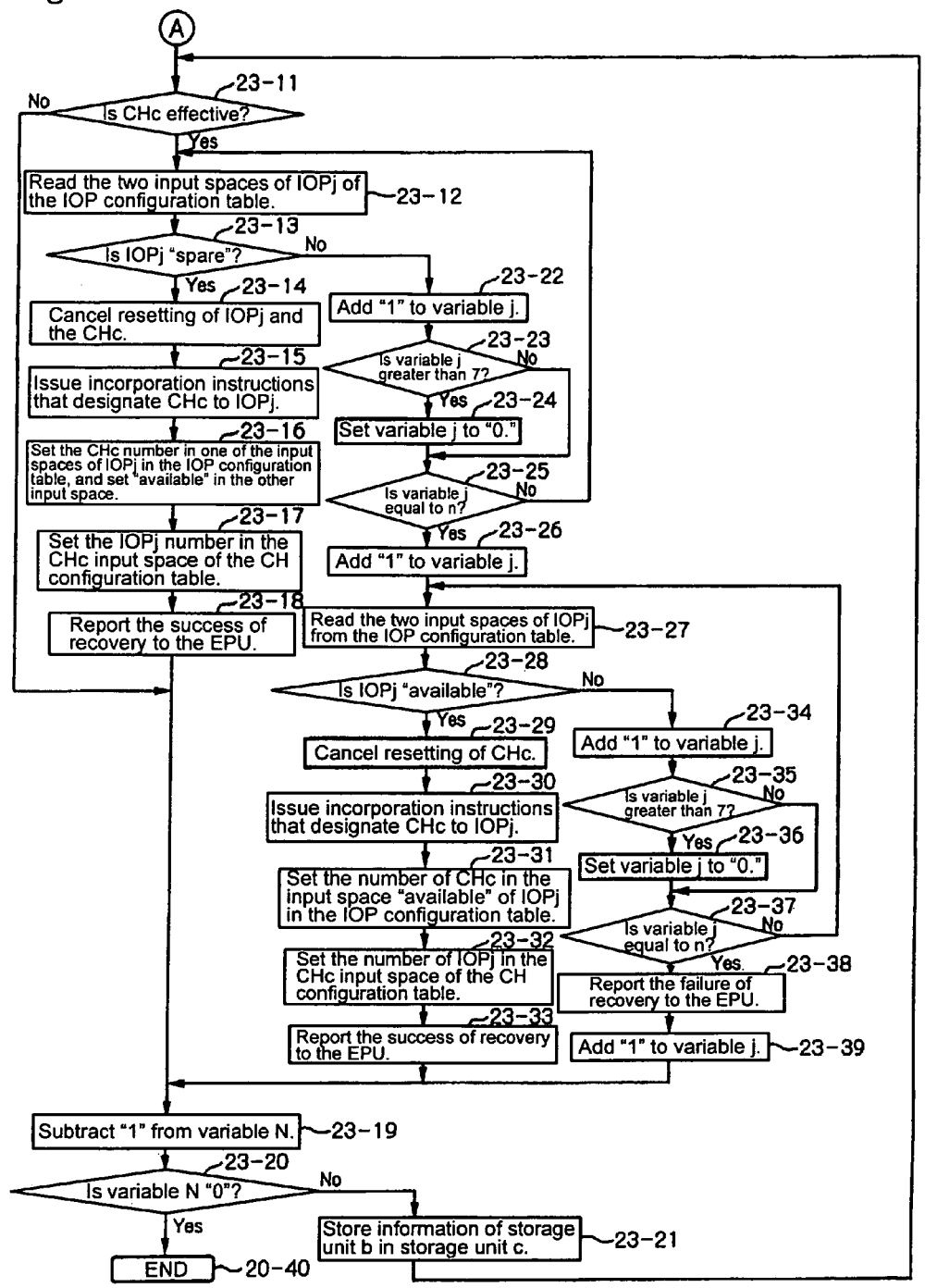
FIG. 26 is a flow chart for explaining the operation of switch unit 23.

FIGS. 25 and 26 are flow charts for explaining the operation of switch unit 23. Explanation next regards the operation of switch unit 23 with reference to FIGS. 25 and 26.

Upon starting operation, switch unit 23 executes Step 23-1.

In Step 23-1, switch unit 23 resets IOP 200 in which the fault occurred in order to halt the operation of IOP 200. Upon completing Step 23-1, switch unit 23 executes Step 23-2.

In Step 23-2, switch unit 23 reads the information in the two input spaces for IOP 200 in IOP configuration table 400 and stores these two items of information in storage units a and b, one item of information being stored in each of storage units "a" and "b". Storage units "a" and "b" are contained in switch unit 23.

Upon completing Step 23-2, switch unit 23 executes Step 23-3.

In Step 23-3, switch unit 23 determines whether the information in storage unit "a" includes a CH number. If the information in storage unit "a" includes a CH number, switch unit 23 determines that CHa is effective, but if the information in storage unit "a" does not include the CH number, switch unit 23 determines that CHa is not effective.

If switch unit 23 determines that CHa is effective, switch unit 23 executes Step 23-4, but if switch unit 23 determines that CHa is not effective, switch unit 23 executes Step 23-6.

In Step 23-4, switch unit 23 resets the CH having the CH number that is indicated by the information in storage unit "a". Upon completing Step 23-4, switch unit 23 executes Step 23-5.

In Step 23-5, switch unit 23 reports the occurrence of a fault of the CH having the CH number that is indicated by the information in storage unit "a". Upon completing Step 23-5, switch unit 23 executes Step 23-6.

In Step 23-6, switch unit 23 determines whether the information in storage unit "b" includes a CH number. If the information in storage unit "b" includes a CH number, switch unit 23 determines that CHb is effective, but if the information in storage unit "b" does not include a CH number, switch unit 23 determines that CHb is not effective.

If switch unit 23 determines that CHb is effective, switch unit 23 executes Step 23-7, but if switch unit 23 determines that CHb is not effective, switch unit 23 executes 23-9.

In Step 23-7, switch unit 23 resets the CH having the CH number that is indicated by the information in storage unit "b". Upon completing Step 23-7, switch unit 23 executes Step 23-8.

In Step 23-8, switch unit 23 reports the occurrence of a fault of the CH having the CH number that is indicated by the information in storage unit "b". Upon completing Step 23-8, switch unit 23 executes Step 23-9.

In the present example, the CH number of CH 3000 is stored in one input space of IOP 200 of IOP configuration table 400, and "available" is set in the other input space.

As a result, switch unit 23 resets CH 3000 and reports the occurrence of a fault of CH 3000 to EPU 100.

In Step 23-9, switch unit 23 writes "unavailable" in the two input spaces of IOP 200 of IOP configuration table 400. Upon completing Step 23-9, switch unit 23 executes Step 23-10.

In Step 23-10, switch unit 23 prepares to search for IOP 20*j* that is to substitute for IOP 200.

More specifically, switch unit 23 substitutes "n+1" for variable j (in this case, n=0), substitutes "2" for variable N, and stores the information in storage unit "a" in storage unit "c". Storage unit "c" is contained in switch unit 23.

Upon completing Step 23-10, switch unit 23 executes Step 23-11 (see FIG. 26).

In Step 23-11, switch unit 23 determines whether the information in storage unit "c" includes a CH number. If the information in storage unit "c" includes a CH number, switch unit 23 determines that CHc is effective, but if the information in storage unit "c" does not include a CH number, switch unit 23 determines that CHc is not effective.

If switch unit 23 determines that CHc is effective, switch unit 23 executes Step 23-12, but if switch unit 23 determines that CHc is not effective, switch unit 23 executes Step 23-19.

In Step 23-12, switch unit 23 reads the information in the two input spaces of IOP 20j (IOPj) of IOP configuration table 400. Upon completing Step 23-12, switch unit 23 executes Step 23-13.

In Step 23-13, switch unit 23 determines if the two items of information indicate "spare."

If the two items of information indicate "spare," switch unit 23 executes Step 23-14, but if neither of the two items of information indicates "spare," switch unit 23 executes Step 23-22.

In Step 23-14, switch unit 23 cancels resetting of IOP 20j (IOPj) and the CH that has the CH number in storage unit "c". Upon completing Step 23-14, switch unit 23 executes Step 23-15.

In Step 23-15, switch unit 23 supplies incorporation instructions that designate the CH having the CH number in storage unit "c" to IOP 20j (IOPj). Upon completing Step 23-15, switch unit 23 executes Step 23-16.

In Step 23-16, switch unit 23 writes the CH number in storage unit "c" to one of the two input spaces of IOP 20j of IOP configuration table 400, and writes "available" in the other input space. Upon completing Step 23-16, switch unit 23 executes Step 23-17.

In Step 23-17, switch unit 23 writes the number of IOP 20j (IOPj) in the input space of CH configuration table 500 that corresponds to the CH number in storage unit "c". Upon completing Step 23-17, switch unit 23 executes Step 23-18.

In Step 23-18, switch unit 23 reports the success of the recovery of CH 3000 to EPU 100. Upon completing Step 23-18, switch unit 23 executes Step 23-19.

On the other hand, in Step 23-22, switch unit 23 adds "1" to variable j. Upon completing Step 23-22, switch unit 23 executes Step 23-23.

In Step 23-23, switch unit 23 determines whether variable j is greater than 7. If variable j is greater than 7, switch unit 23 executes Step 23-24, but if variable j is not greater than 7, switch unit 23 executes Step 23-25.

In Step 23-24, switch unit 23 sets variable j to "0." Upon completing Step 23-24, switch unit 23 executes Step 23-25.

In Step 23-25, switch unit 23 determines whether variable j is n or not (in this case, n=0). If variable j is equal to n, switch unit 23 executes Step 23-26, but if variable j is not equal to n, switch unit 23 executes Step 23-12.

By executing Steps 23-12, 23-13, and 23-22 to 23-25, switch unit 23 searches for IOP 20j that is set to "spare."

If there is no IOPj that is set to "spare," switch unit 23 executes the processing that follows Step 23-26.

In Step 23-26, switch unit 23 adds "1" to variable j. Upon completing Step 23-26, switch unit 23 executes Step 23-27.

The process that is carried out in Step 23-27 is identical to the process that is carried out in Step 23-12. Upon completing Step 23-27, switch unit 23 executes Step 23-28.

In Step 23-28, switch unit 23 determines whether either the two items of information indicates "available."

If either of the two items of information indicates "available," switch unit 23 executes Step 23-29, but if neither of the items of information indicates "available," switch unit 23 executes Step 23-34.

In Step 23-29, switch unit 23 cancels the resetting of CH having the CH number in storage unit "c". Upon completing Step 23-29, switch unit 23 executes Step 23-30.

The process that is carried out in Step 23-30 is identical to the process carried out in Step 23-15. Upon completing Step 23-30, switch unit 23 executes Step 23-31.

In Step 23-31, switch unit 23 writes the CH number in storage unit "c" in, of the two input spaces of IOP 20j of IOP configuration table 400, the input space in which "available" is stored. Upon completing Step 23-31, switch unit 23 executes Step 23-32, and then executes Step 23-33.

The process that is executed in Step 23-32 is identical to the process that is carried out in Step 23-17, and the process that is carried out in Step 23-33 is identical to the process that is carried out in Step 23-18. Upon completing Step 23-33, switch unit 23 executes Step 23-19.

In Step 23-34, switch unit 23 adds "1" to variable j. Upon completing Step 23-34, switch unit 23 executes Step 23-35.

In Step 23-35, switch unit 23 determines whether variable j is greater than 7. If variable j is greater than 7, switch unit 23 executes Step 23-36, but if variable j is not greater than 7, switch unit 23 executes Step 23-37.

In Step 23-36, switch unit 23 sets variable j to "0." Upon completing Step 23-36, switch unit 23 executes Step 23-37.

In Step 23-37, switch unit 23 determines whether variable j is equal to n (in this case, n=0). If variable j is equal to n, switch unit 23 executes Step 23-38, but if variable j is not equal to n, switch unit 23 executes Step 23-27.

By executing Steps 23-27, 23-28, and 23-34 to 23-37, switch unit 23 searches for IOP 20j that is set to "available."

When IOP 20j that is set to "available" does not exist, switch unit 23 executes the processing that follows Step 23-38.

In Step 23-38, switch unit 23 reports the failure of the recovery of CH 3000 to EPU 100. Upon completing Step 23-38, switch unit 23 executes Step 23-39.

In Step 23-39, switch unit 23 adds "1" to variable j. Upon completing Step 23-39, switch unit 23 executes Step 23-19.

In Step 23-19, switch unit 23 subtracts "1" from variable N. Upon completing Step 23-19, switch unit 23 executes Step 23-20.

In Step 23-20, switch unit 23 determines if variable N is "0." If variable N is "0" switch unit 23 executes Step 2340, and if variable N is not "0," switch unit 23 executes Step 23-21.

In Step 23-21, switch unit 23 deletes the information in storage unit "c", and then stores the information in storage unit "b" in storage unit "c2. Upon completing Step 23-21, switch unit 23 executes Step 23-11.

In Step 2340, switch unit 23 ends the operation.

In the present example, there is no IOP (IOP) that is set to "spare," and switch unit 23 therefore searches for IOP 20j that can be used.

In the present example, moreover, the CH number of CH 3001 is stored in one of the two input spaces of IOP 201 of IOP configuration table 400, and "available" is stored in the other input space (see FIG. 19). As a result, switch unit 23 selects IOP 201 as the substitute for IOP 200.

Switch unit 23 then cancels the resetting of CH 3000 and delivers incorporation instructions to IOP 201 that designate CH 3000.

Switch unit 23 then writes the CH number of CH 3000 into, of the input spaces of IOP 201 of IOP configuration table 400 (see FIG. 19), the input space that is "available."

Switch unit 23 then writes the IOP number of IOP 201 in the input space of CH 3000 of CH configuration table 500 (see FIG. 20).

Switch unit 23 then reports the success of the recovery of CH 3000 to EPU 100.

By means of the operation of switch unit 23, IOP 201 is selected as the substitute for IOP 200 in which a fault occurred. In addition, IOP configuration table 400 assumes the form shown in FIG. 27. IOP 200 is set to "unavailable." As a result, IOP 201 controls CH 3000 and 3001.

Figures 27, 28, 29:
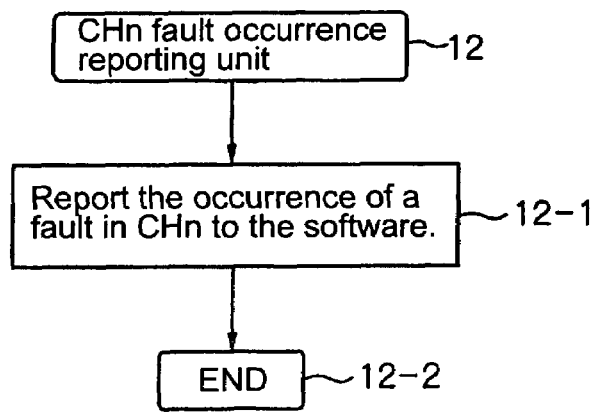
FIG. 27 is an explanatory view showing an example of IOP configuration table 400.
FIG. 28 is an explanatory view showing an example of CH configuration table 500.
FIG. 29 is a flow chart for explaining the operation of reporting unit 12.

Alternatively, CH configuration table 500 assumes the form shown in FIG. 28 and CH 3000 is controlled by IOP 201.

By means of the operation of switch unit 23, incorporation instructions that designate CH 3000 are provided to IOP 201.

When IOP 201 receives these incorporation instructions, incorporation unit 30 of IOP 201 begins operation (see FIG. 21).

Incorporation unit 30 reads the information in SLOT 0201-5 by controlling processor 201-1 and then, based on this information, verifies whether SLOT 0201-5 is available (Steps 30-1-3).

In the present example, SLOT 0201-5 is being used by CH 3001 at this time, and incorporation unit 30 therefore next controls processor 201-1 in order to read the information in SLOT 1201-6, and then, based on this information, verifies whether SLOT 1201-6 is available or not (Steps 30-7-9).

In the present example, SLOT 1201-6 is unused at this time, and SLOT 1201-6 is therefore available. As a result, incorporation unit 30 sets "in use at CH 3000" and the control information of CH 3000 in SLOT 1201-6 (Step 30-10). Incorporation unit 30 then initializes CH 3000 and sets information, which indicate that CH 3000 is controlled by IOP 201" in CH 3000 (Step 30-5).

By means of the operation of switch unit 23, the report of the occurrence of a fault of CH 3000 and the report of the success of recovery from the fault are transmitted to EPU 100.

When EPU 100 receives the report of the occurrence of a fault of CH 3000, reporting unit 12 of EPU 100 begins operation.

FIG. 29 is a flow chart for explaining the operation of reporting unit 12. Explanation next regards the operation of reporting unit 12 with reference to FIG. 29.

Reporting unit 12, upon starting operation, executes Step 12-1.

In Step 12-1, reporting unit 12 reports the occurrence of a fault of CH 3000 to the software. Upon completing Step 12-1, reporting unit 12 executes Step 12-2.

In Step 12-2, reporting unit 12 ends the operation.

When EPU 100 receives the report of the success of the recovery from the fault of CH 3000, reporting unit 13 of EPU 100 begins operation.

Figure 30:
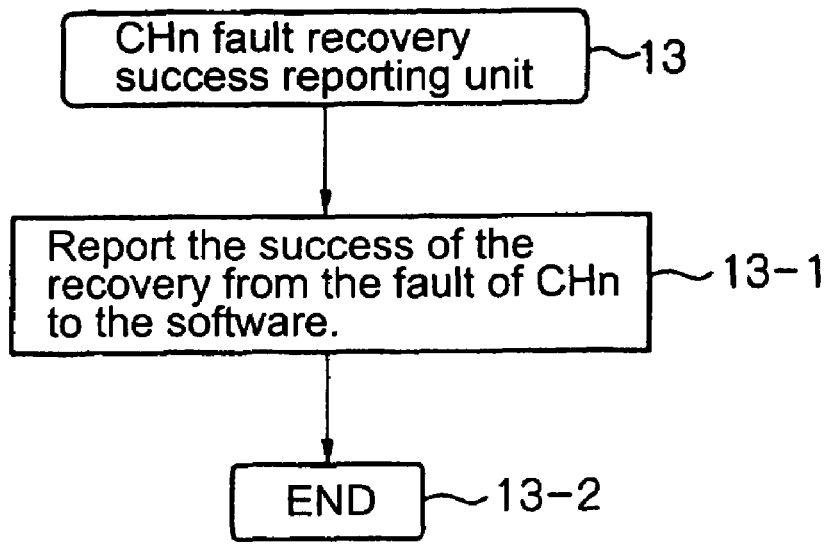
FIG. 30 is a flow chart for explaining the operation of reporting unit 13.

FIG. 30 is a flow chart for explaining the operation of reporting unit 13. Explanation next regards the operation of reporting unit 13 with reference to FIG. 30.

Upon starting operation, reporting unit 13 executes Step 13-1.

In Step 13-1, reporting unit 13 reports the success of the recovery from the fault of CH 3000 to the software. Upon completing Step 13-1, reporting unit 13 executes Step 13-2.

In Step 13-2, reporting unit 13 ends the operation.

Upon receiving the report of the occurrence of a fault of CH 3000 from EPU 100, the software discards the data transfer instructions that designate CH 3000 and that is being generated by now, and then waits for the report of recovery from the fault from EPU 100. If the software then receives the report of success of the recovery from the fault within a fixed time interval, the software again provides EPU 100 with the data transfer instructions that were discarded.

In this way, EPU 100 receives data transfer instructions that designate CH 3000 from the software, whereby instruction unit 10 of EPU 100 begins operation (see FIG. 22).

Instruction unit 10 reads the information in the input spaces of CH 3000 of CH configuration table 500 and then, based on this information, verifies whether CH 3000 is available or not (Steps 10-1 and 2).

In the present example, the IOP number of IOP 201 is stored in these input spaces at this time, and CH 3000 is available. Instruction unit 10 therefore supplies data transfer instructions that designate CH 3000 to IOP 201 (Step 10-3) and then reports the instruction success to the software (Step 10-4).

When IOP 201 receives the data transfer instructions that designate CH 3000 from EPU 100, data transfer unit 32 of IOP 201 begins operation (see FIG. 24).

Data transfer unit 32 controls processor 201-1 to read the information from SLOT 0201-5, and based on this information, verifies the condition of SLOT 0201-5 (Steps 32-1 to 3).

In the present example, the information of CH 3001 is stored in SLOT 0201-5 at this time. As a result, data transfer unit 32 next controls processor 201-1 to read the information from SLOT 1201-6, and based on this information, verifies the condition of SLOT 1201-6 (Steps 32-7 to 9).

In the present example, the information of CH 3000 is stored in SLOT 0201-6 (in use by CH 3000) at this time. As a result, based on this information, instruction unit 32 controls CH 3000 to perform data transfer (Step 32-4), and reports the completion of data transfer to EPU 100 (Step 32-5).

When EPU 100 receives the report of the completion of data transfer from IOP 201, reporting unit 11 begins operation (see FIG. 23). Reporting unit 11 reports the completion of data transfer to the software (Step 11-1).

As a result, even if a fault should occur in IOP 200 when the software is performing data transfer between PU 4000 and memory 300 to 307 by way of CH 3000 and IOP 200, IOP 201 controls CH 3000 in place of IOP 200. As a result, the software is able to continue data transfer.

Explanation next regards the operation when IOP 200 in which a fault has occurred is exchanged for a new IOP 200.

When IOP 200 in which a fault has occurred is exchanged for a new IOP 200, exchange unit 24 of DGP 1000 begins operation.

Figure 31:
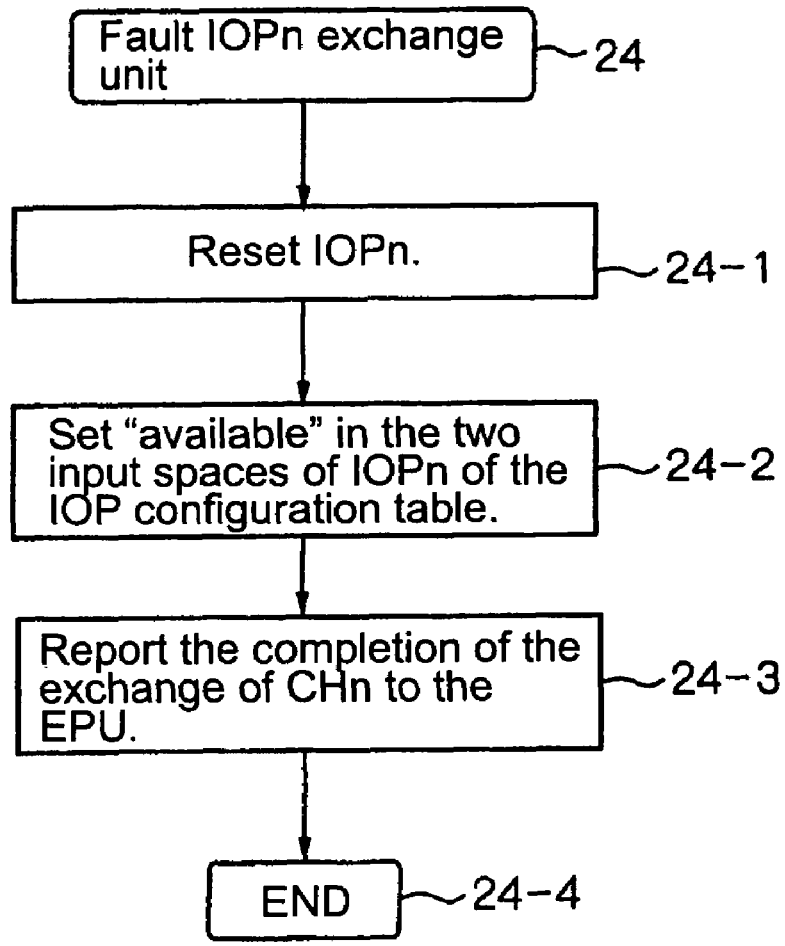
FIG. 31 is a flow chart for explaining the operation of exchange unit 24.

FIG. 31 is a flow chart for explaining the operation of exchange unit 24. The operation of exchange unit 24 is next described with reference to FIG. 31.

Upon starting operation, exchange unit 24 executes Step 24-1.

In Step 24-1, exchange unit 24 resets the new IOP 200. Upon completing Step 24-1, exchange unit 24 executes Step 24-2.

In Step 24-2, exchange unit 24 writes "available" in the two input spaces of IOP 200 of IOP configuration table 400. Upon completing Step 24-2, exchange unit 24 executes 24-3.

In Step 24-3, exchange unit 24 reports the completion of exchange of CH 3000 to EPU 10x. Upon completing Step 24-3, exchange unit 24 executes Step 24-4.

In Step 24-4, exchange unit 24 terminates the operation.

When EPU 10x receives the report of the completion of exchange of CH 3000 from DGP 1000, reporting unit 15 of EPU 10x begins operation.

Figure 32:
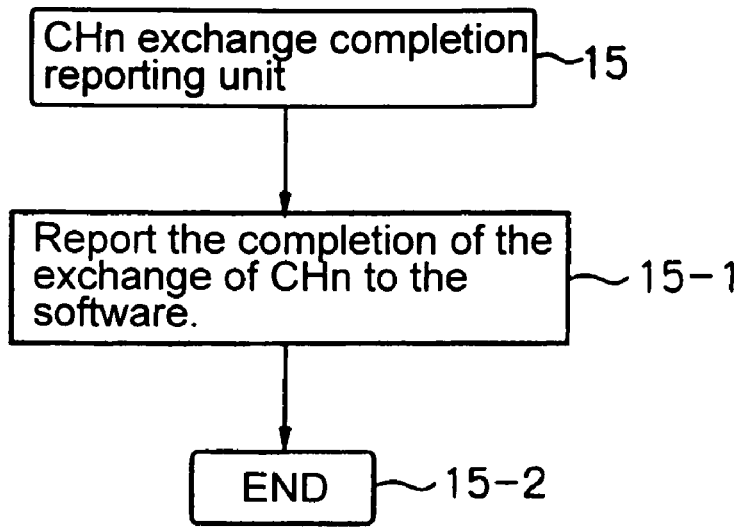
FIG. 32 is a flow chart for explaining the operation of reporting unit 15.

FIG. 32 is a flow chart for explaining the operation of reporting unit 15. The following explanation regards the operation of reporting unit 15 with reference to FIG. 32.

Upon starting operation, reporting unit 15 executes Step 15-1.

In Step 15-1, reporting unit 15 reports the completion of the exchange of CH 3000 to the software. Upon completing Step 15-1, reporting unit 15 executes Step 15-2.

In Step 15-2, reporting unit 15 terminates the operation.

Upon receiving the report of the completion of the exchange of CH 3000 from EPU 10x, the software suppresses the data transfer instructions that designate CH 3000 and waits for the report of completion of the instructions of data transfer that has already been supplied. Upon receiving this report of the completion of data transfer, the software supplies cut-off instructions designating CH 3000 to EPU 10x.

When EPU 10x receives the cut-off instructions that designate CH 3000 from the software, cut-off unit 16 of EPU 10x begins operation.

Figure 33:
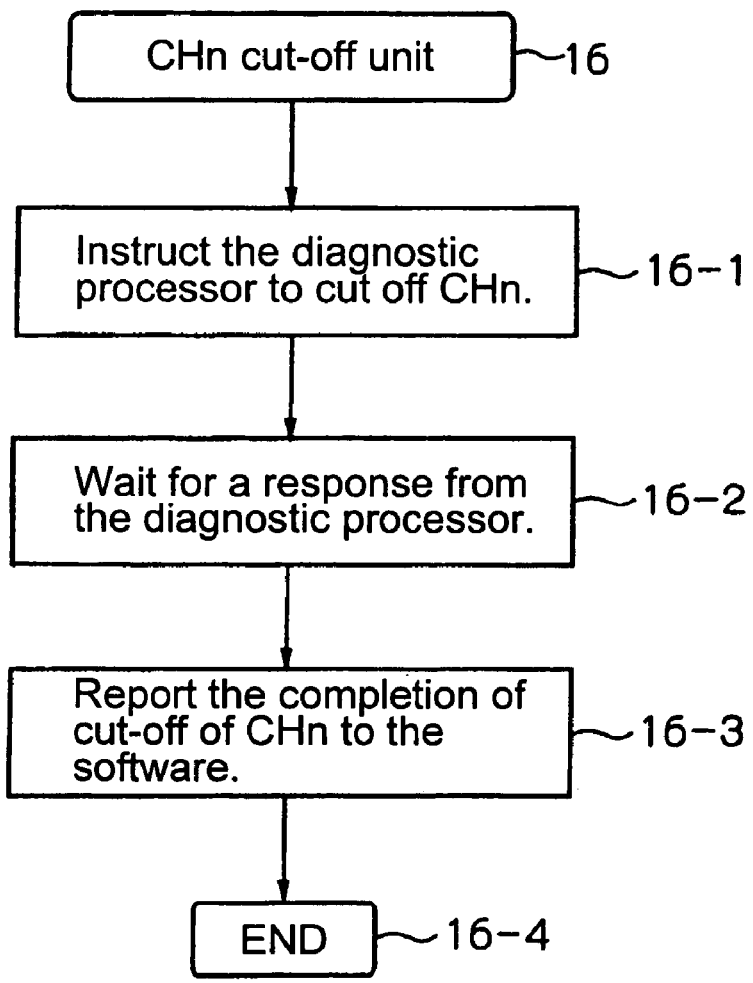
FIG. 33 is a flow chart for explaining the operation of cut-off unit 16.

FIG. 33 is a flow chart for explaining the operation of cut-off unit 16. The operation of cut-off unit 16 is next described with reference to FIG. 33.

Upon starting operation, cut-off unit 16 executes Step 16-1.

In Step 16-1, cut-off unit 16 supplies cut-off instructions that designate CH 3000 to DGP 1000. Upon completing Step 16-1, cut-off unit 16 executes Step 16-2.

In Step 16-2, cut-off unit 16 waits for the response of DGP 1000. Upon completing Step 16-2, cut-off unit 16 executes Step 16-3.

In Step 16-3, upon receiving the response of DGP 1000, cut-off unit 16 reports the completion of cut-off of CH 3000 to the software. Upon completing Step 16-3, cut-off unit 16 executes Step 16-4.

In Step 16-4, cut-off unit 16 ends the operation.

When DGP 1000 receives the cut-off instructions that designate CH 3000 from EPU 10x, cut-off unit 22 of DGP 1000 begins operation.

Figure 34:
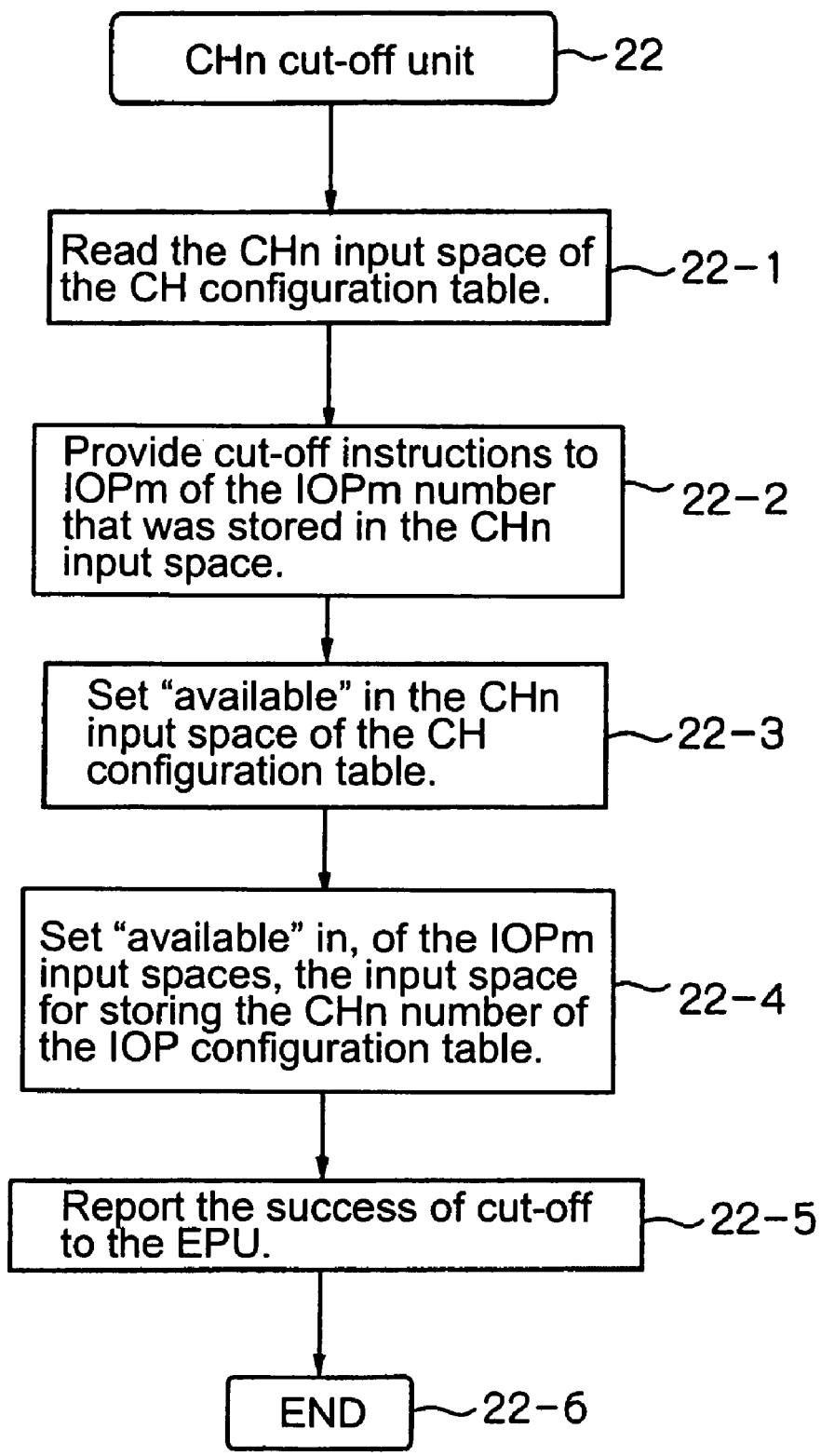
FIG. 34 is a flow chart for explaining the operation of cut-off unit 22.

FIG. 34 is a flow chart for explaining the operation of cut-off unit 22. The following explanation regards the operation of cut-off unit 22 with reference to FIG. 34.

Upon starting operation, cut-off unit 22 executes Step 22-1.

In Step 22-1, cut-off unit 22 specifies the input space of CH 3000 that was designated by the cut-off instructions in CH configuration table 500 and reads the information in this input space. Upon completing Step 22-1, cut-off unit 22 executes Step 22-2.

In Step 22-2, cut-off unit 22 provides cut-off instructions to IOP 20m that has the IOP number indicated by this information.

In the present example, the IOP number of IOP 201 is stored in this input space at this time, and the cut-off instructions are therefore provided to IOP 201.

Upon completing Step 22-2, cut-off unit 22 executes Step 22-3.

In Step 22-3, cut-off unit 22 writes "available" in the input space of CH 3000 of CH configuration table 500. Upon completing Step 22-3, cut-off unit 22 executes Step 22-4.

In Step 22-4, cut-off unit 22 sets "available" in, of the input spaces of IOP 201 of IOP configuration table 400, the input space that indicated the CH number of CH 3000. Upon completing Step 22-4, cut-off unit 22 executes Step 22-5.

In Step 22-5, cut-off unit 22 reports the completion of cut-off to EPU 10x. Upon completing Step 22-5, cut-off unit 22 executes Step 22-6.

In Step 22-6, cut-off unit 22 terminates the operation.

When IOP 201 receives cut-off instructions that designate CH 3000 from DGP 1000, cut-off unit 31 of IOP 201 begins operation.

Figure 35:
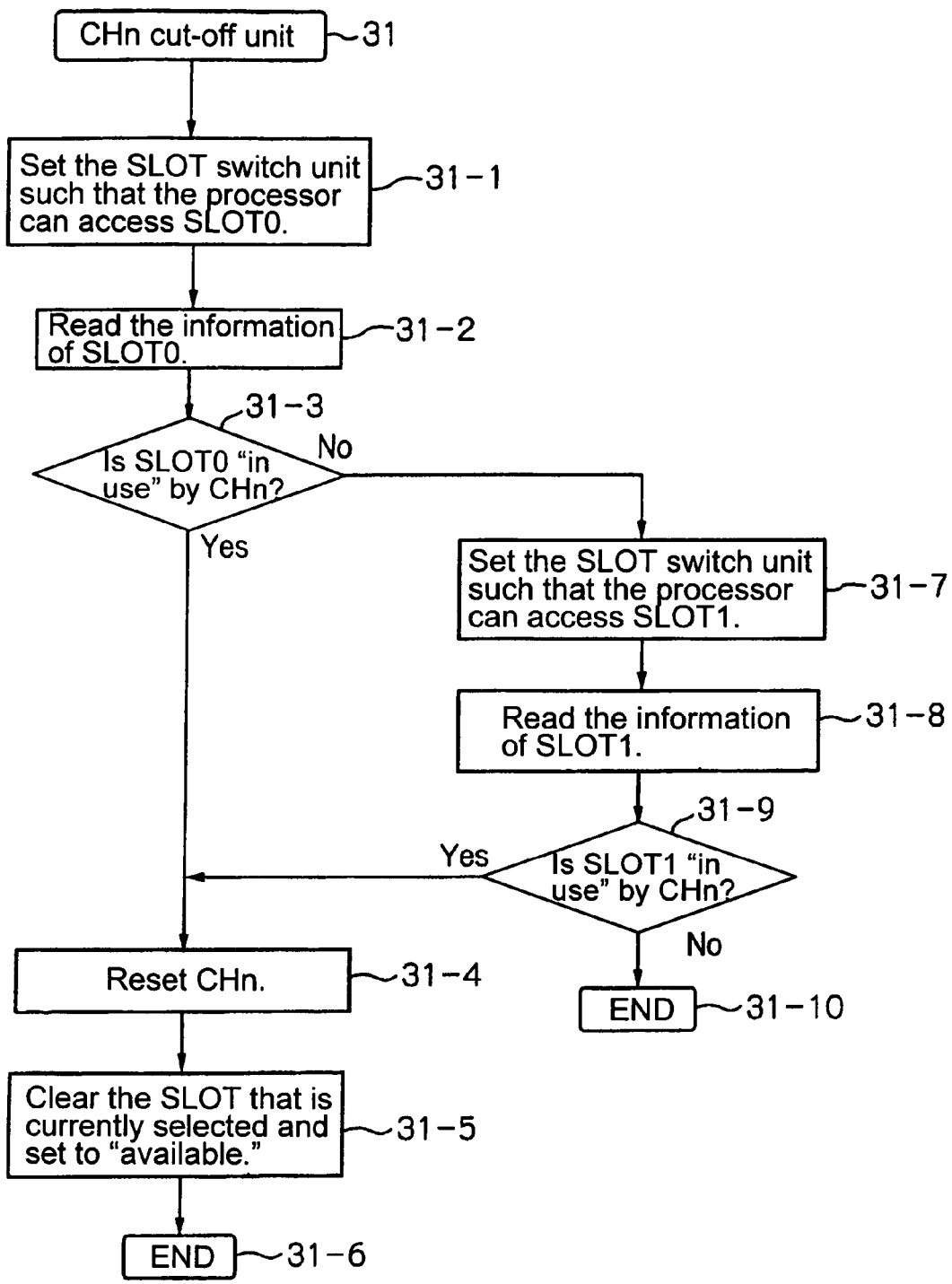
FIG. 35 is a flow chart for explaining the operation of cut-off unit 31.

FIG. 35 is a flow chart for explaining the operation of cut-off unit 31. The following explanation regards the operation of cut-off unit 31 with reference to FIG. 35.

Upon starting operation, cut-off unit 31 executes Step 31-1.

In Step 31-1, cut-off unit 31 sets SLOT switch unit 20n-2 such that processor 20n-1 can access SLOT020n-5. Upon completing Step 31-1, cut-off unit 31 executes Step 31-2.

In Step 31-2, cut-off unit 31 reads the information from SLOT 020n-5. Upon completing Step 31-2, cut-off unit 31 executes Step 31-3.

In Step 31-3, cut-off unit verifies whether the information indicates that SLOT 020n-5 is in use in CH 300n.

If the information indicates that SLOT 020n-5 is in use in CH 300n, cut-off unit 31 executes Step 31-4, but if this information indicates that SLOT 020n-5 is not in use in CH 300n, cut-off unit 31 executes Step 31-7.

In Step 31-4, cut-off unit 31 resets CH 300n that has the CH number in SLOT0200-5. Upon completing Step 31-4, cut-off unit 31 executes Step 31-5.

In Step 31-5, cut-off unit 31 clears the SLOT that is currently selected in SLOT switch unit and sets this SLOT to "available." Upon completing Step 31-5, cut-off unit 31 executes Step 31-6.

In Step 31-6, cut-off unit 31 ends the operation.

In Step 31-7, cut-off unit 31 sets SLOT switch unit 20n-2 such that processor 20n-1 can access SLOT 120n-6. Upon completing Step 31-7, cut-off unit 31 executes Step 31-8.

In Step 31-8, cut-off unit 31 reads the information from SLOT 120n-6. Upon completing Step 31-8, cut-off unit 31 executes Step 31-9.

In Step 31-9, cut-off unit 31 checks whether this information indicates that SLOT 120n-6 is in use in CH 300n.

If this information indicates that SLOT 120n-6 is in use in CH 300n, cut-off unit 31 executes Step 31-4, but if this information indicates that SLOT 120n-6 is not in use in CH 300n, cut-off unit 31 executes Step 31-10.

In Step 31-10, cut-off unit 31 ends the operation.

In the present example, when Step 31-3 is being executed, SLOT 0201-5 is in use in CH 3001, and as a result, cut-off unit 31 controls processor 201-1 to read information from SLOT1201-6, and based on this information, verifies whether SLOT 1201-6 is in use in CH 3000.

In the present example, SLOT 1201-6 is being used in CH 3000 when Step 31-9 is being executed. Cut-off unit 31 therefore resets CH 3000, clears the information in SLOT 1201-6, and then writes "available" in SLOT 1201-6.

Upon receiving cutoff completion of CH 3000 from EPU 10x, the software supplies incorporation instructions that designate CH 3000 to EPU 10x, and then waits for the report of the completion of incorporation. The report of the completion of incorporation is supplied from EPU 10x.

When EPU 10x receives the incorporation instructions that designate CH 3000 from the software, incorporation unit 17 of EPU 10x begins operation.

Figure 36:
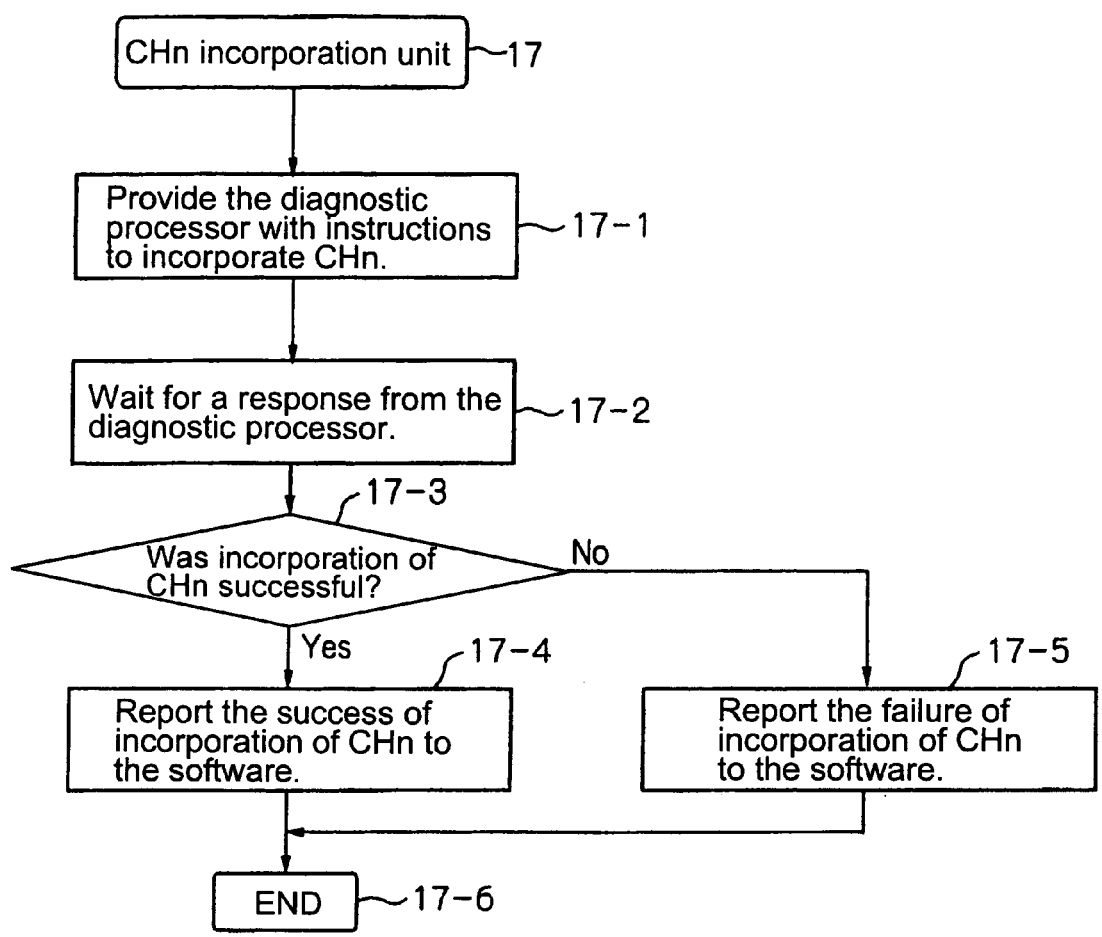
FIG. 36 is a flow chart for explaining the operation of incorporation unit 17.

FIG. 36 is a flow chart for explaining the operation of incorporation unit 17. The following description regards the operation of incorporation unit 17 with reference to FIG. 36.

Upon starting operation, incorporation unit 17 executes Step 17-1.

In Step 17-1, incorporation unit 17 supplies incorporation instructions that designate CH 3000 to DGP 1000. Upon completing Step 17-1, incorporation unit 17 executes Step 17-2.

In Step 17-2, incorporation unit 17 waits for the response of DGP 1000. Upon completing Step 17-2, incorporation unit 17 executes Step 17-3.

In Step 17-3, incorporation unit 17 checks the response of DGP 1000, and executes Step 17-4 when this response indicates the success of incorporation, and executes Step 17-5 when this response indicates failure of incorporation.

In Step 17-4, incorporation unit 17 transmits a report of the completion of incorporation of CH 3000 to the software. Upon completing Step 17-4, incorporation unit 17 executes Step 17-6.

In Step 17-5, on the other hand, incorporation unit 17 transmits a report of the failure of incorporation of CH 3000 to the software. Upon completing Step 17-5, incorporation unit 17 executes Step 17-6.

In Step 17-6, incorporation unit 17 ends the operation.

When DGP 1000 receives incorporation instructions that designate CH 3000 from EPU 10x, incorporation unit 21 of DGP 1000 begins operation.

Figure 37:
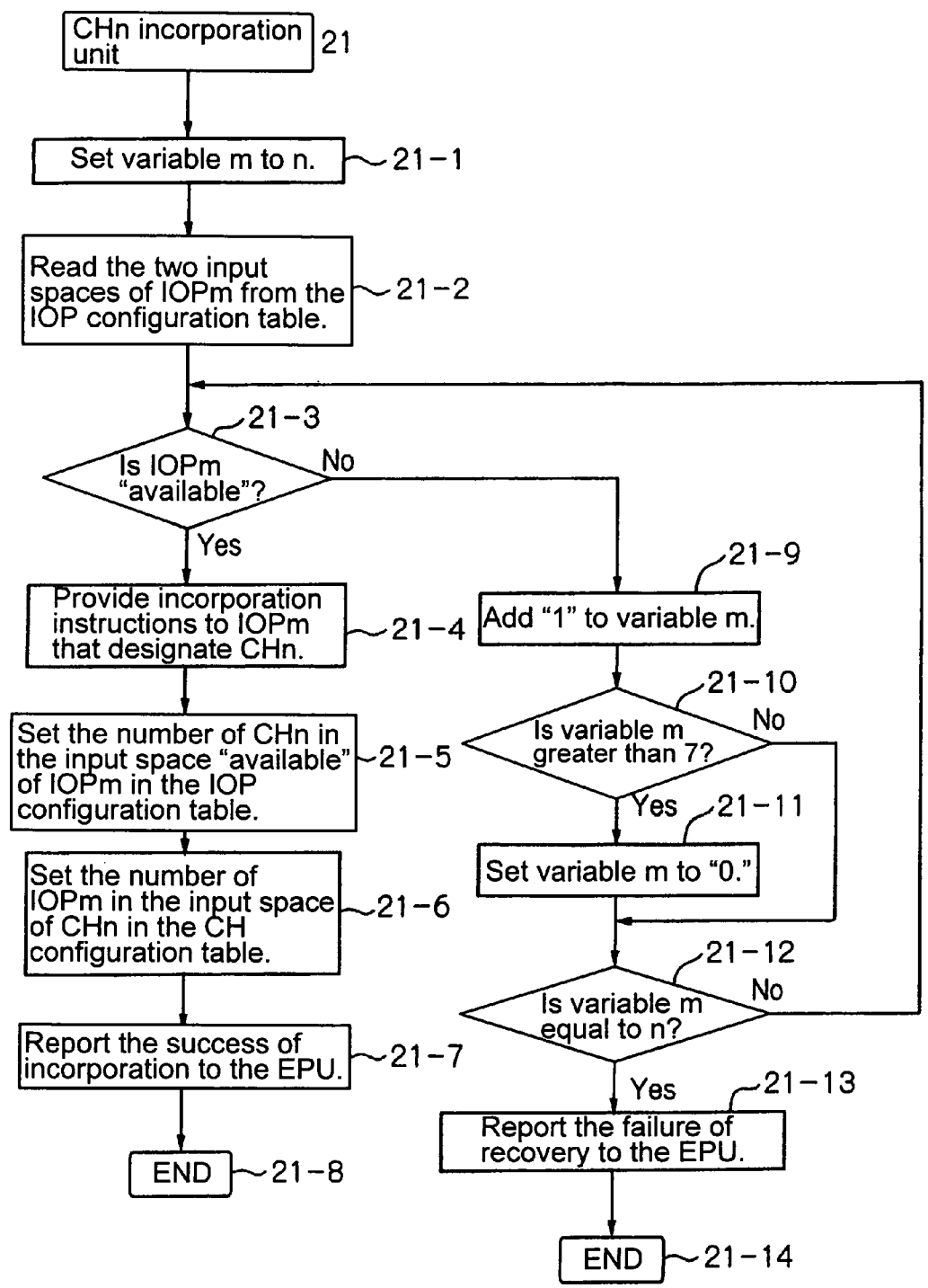
FIG. 37 is a flow chart for explaining the operation of incorporation unit 21.

FIG. 37 is a flow chart for explaining the operation of incorporation unit 21. The following explanation regards the operation of incorporation unit 21 with reference to FIG. 37.

Upon starting operation, incorporation unit 21 executes Step 21-1.

In Step 21-1, incorporation unit 21 substitutes the number n of the CH that is designated by the incorporation instructions for variable m. Variable m is included in incorporation unit 21. Upon completing Step 21-1, incorporation unit 21 executes 21-2.

In Step 21-2, incorporation unit 21 reads the information in the two input spaces of IOP 20m (IOPm) of IOP configuration table 400. Upon completing Step 21-2, incorporation unit 21 executes Step 21-3.

In Step 21-3, incorporation unit 21 determines whether this information is "available" or not. If the information is "available," incorporation unit 21 executes Step 21-4, but if the information is not "available," incorporation unit 21 executes Step 21-9.

In Step 21-4, incorporation unit 21 supplies incorporation instructions that designate CH 300n to IOP 20m. Upon completing Step 21-4, incorporation unit 21 executes Step 21-5.

In Step 21-5, incorporation unit 21 deletes this "available" from, of the two input spaces of IOP 20m of IOP configuration table 400, the input space in which "available" is stored, and then writes the CH number of CH 300n in this input space. Upon completing Step 21-5, incorporation unit 21 executes Step 21-6.

In Step 21-6, incorporation unit 21 writes the number (IOPm) of IOP 20m in the input space of CH 300n of CH configuration table 500. Upon completing Step 21-6, incorporation unit 21 executes Step 21-7.

In Step 21-7, incorporation unit 21 transmits a report of the completion of incorporation to EPU 10x. Upon completing Step 21-7, incorporation unit 21 executes Step 21-8.

In Step 21-8, incorporation unit 21 ends the operation.

In Step 21-9, on the other hand, incorporation unit 21 adds "1" to variable m. Upon completing Step 21-9, incorporation unit 21 executes Step 21-10.

In Step 21-10, incorporation unit 21 determines whether variable m is greater than 7 or not. If variable m is greater than 7, incorporation unit 21 executes Step 21-11, but if variable m is not greater than 7, incorporation unit 21 executes Step 21-12.

In Step 21-11, incorporation unit 21 substitutes "0" for variable m. Upon completing Step 21-11, incorporation unit 21 executes Step 21-12.

In Step 21-12, incorporation unit 21 determines whether variable m is identical to n that is designated in the incorporation instructions. If variable m is the same as n, incorporation unit 21 executes Step 21-13, but if variable m differs from this n, incorporation unit 21 executes Step 21-3.

In Step 21-13, incorporation unit 21 transmits a report of the failure of incorporation to EPU 10x. Upon completing Step 21-13, incorporation unit 21 executes Step 21-14.

In Step 21-14, incorporation unit 21 ends the operation.

In the present example, incorporation unit 21 sequentially reads the information that is stored in the two input spaces of IOP configuration table 400 with IOP 200 that corresponds to CH 3000 as the starting point in order to check whether IOP 20m is available or not.

In the present example, IOP 200 is available at this time, and as a result, incorporation unit 21 carries out incorporation instructions to IOP 200 that designate CH 3000.

Incorporation unit 21 next writes the CH number of CH 3000 to one of the input spaces of IOP 200 of IOP configuration table 400. Incorporation unit 21 then writes the IOP number of IOP 200 in the input space of CH 3000 of CH configuration table 500, and then transmits a report of the completion of incorporation to EPU 10x.

When IOP 200 receives the incorporation instructions that designate CH 3000 from DGP 1000, incorporation unit 30 begins operation. This operation is identical to the operation carried out by incorporation unit 30 when information processor 1A is activated.

Upon receiving a report of the success of incorporation (completion of exchange) of CH 3000 from EPU 10x, the software releases the instructions for data transfer to CH 3000 that had been held back.

When the software subsequently supplies data transfer instructions that designate CH 3000, IOP configuration table 400 and CH configuration table 500 have returned to the state preceding the occurrence of a fault in IOP 200, as shown in FIGS. 19 and 20. As a result, data transfer is carried out in the state that preceded the occurrence of a fault in IOP 200, and the exchange of IOP 200 is complete.

Explanation next regards the operation when IOP configuration information 1004 and CH configuration information 1005 are set as shown in FIGS. 38 and 39 at the time of activation of information processor 1A.

As shown in FIG. 38, IOP 200, 202, 204, and 206 are set to "available" and IOP 201, 203, 205, and 207 are set to "spare" in IOP configuration information 1004.

As shown in FIG. 39, CH 3000, 3002, 3004, and 3006 are set to "available" and CH 3001, 3003, 3005, and 3007 are set to "unavailable" in CH configuration information 1005.

When information processor 1A is started up in this state, incorporation unit 20 of DGP 1000 operates as described below (see FIG. 18).

Incorporation unit 20 resets IOP 200-207 and CH 3000-3007 (Step 20-1).

Incorporation unit 20 then reads the configuration information of IOP 200-207 one at a time from IOP configuration information 1004 (Steps 20-2 and 20-3).

Incorporation unit 20 next checks whether each of IOP 200-207 is set to "available" or "unavailable," and further checks whether each of IOP 200-207 is set to "spare" (Steps 20-4 and 6).

In the present example, IOP configuration information 1004 is set as shown in FIG. 38, "available" therefore being set in the two input spaces of each of IOP 200, 202, 204, and 206 of IOP configuration table 400 (Step 20-5), and "spare" being set in the two input spaces of each of IOP 201, 203, 205, and 207 (Step 20-7).

Incorporation unit 20 next reads the configuration information of CH 3000-3007 one at a time from CH configuration information 1005 (Steps 20-11 and 12).

Incorporation unit 20 then checks whether each of CH 3000-3007 is set to "available" or set to "unavailable" (Step 20-13).

In the present example, CH configuration information 1005 is set as shown in FIG. 39, "unavailable" being set in the input space of each of CH 3001, 3003, 3005, and 3007 of CH configuration table 500 (Step 20-22).

Incorporation unit 20 next reads the states of IOP 200, 202, 204, and 206 having the same number "n" as the CH numbers "n" of CH 3000, 3002, 3004, and 3006 that are "available" in CH configuration table 500 from the two input spaces of IOP configuration table 400. Incorporation unit 20 checks whether either of these two items of information includes "available" (Steps 20-14 and 15).

In the present example, IOP 200, 202, 204, and 206 are set to "available" at this time.

Incorporation unit 20 therefore resets IOP 200, 202, 204, and 206 as well as CH 3000, 3002, 3004, and 3006 (Step 20-16), and then provides incorporation instructions that designate CH 3000, 3002, 3004, and 3006 to IOP 200, 202, 204, and 206 (Step 20-17).

Incorporation unit 20 next sets the CH number of CH 3000, 3002, 3004, and 3006 to one input space of IOP 200, 202, 204, and 206, respectively, of IOP configuration table 400 (Step 20-18), and sets the IOP numbers of IOP 200, 202, 204, and 206 to the input spaces of CH 3000, 3002, 3004, and 3006, respectively, of CH configuration table 500 (Step 20-19).

As a result, IOP configuration table 400 is as shown in FIG. 40, and CH configuration table 500 is as shown in FIG. 41.

By means of the operation of incorporation unit 20, incorporation instructions that designate CH 3000 are provided to IOP 200, incorporation instructions that designate CH 3002 are provided to IOP 202, incorporation instructions that designate CH 3004 are provided to IOP 204, and incorporation instructions that designate CH 3006 are provided to IOP 206.

When each of IOP 200, 202, 204, and 206 receive these incorporation instructions, incorporation unit 30 of each of IOP 200, 202, 204, and 206 begin operation (see FIG. 21). This operation is identical to the operation that was described with reference to FIG. 21.

IOP 20n is placed in correspondence with CH 300n by means of the operations of incorporation unit 20 of DGP 1000 and incorporation unit 30 of IOP 200.

When IOP 20n corresponds to CH 300n, IOP 20n and CH 300n can be used by EPU 10x. In this state, EPU 10x can provide IOP 20n with data transfer instructions that designate CH 300n under the instructions of the software.

In addition, the operation when EPU 100, under the instructions of the software, supplies IOP 200 with data transfer instructions that designate CH 3000 is identical to the previously described operation.

Explanation next regards the operation when a fault occurs in IOP 200 when EPU 100 provides data transfer instructions that designate CH 3000 to IOP 200 in accordance with the instructions of the software.

When a fault occurs in IOP 200, switch unit 23 begins operation (see FIGS. 25 and 26).

Switch unit 23 causes the halt of operation of IOP 200 in which the fault has occurred by resetting IOP 200 (Step 23-1).

Switch unit 23 then reads the information in the two input spaces of IOP 200 of IOP configuration table 400 (Step 23-2).

Switch unit 23 then verifies whether this information indicates a CH number, i.e., whether a CH having this CH number is effective or not (Steps 23-3 and 6).

In the present example, the CH number of CH 3000 is stored in one of the input spaces, and "available" is set in the other input space. Switch unit 23 therefore resets CH 3000 (Steps 23-4 and 7) and transmits a report of the occurrence of a fault of CH 3000 to EPU 100 (Steps 23-5 and 8).

Switch unit 23 writes "unavailable" in the two input spaces of IOP 200 of IOP configuration table 400 (Step 23-9) and then begins preparation to search for IOP 20j that is to substitute for IOP 200 (Step 23-10).

Switch unit 23 refers to IOP configuration table 400 in order to search for spare IOP (Steps 23-12, 13, and 22-25).

In the present example, IOP 201 is set as a spare IOP at this time, and IOP 201 is therefore selected as the substitute of IOP 200.

Switch unit 23 then cancels the resetting of IOP 201 and CH 3000 (Step 23-14), and then supplies incorporation instructions that designate CH 3000 to IOP 201 (Step 23-15).

Switch unit 23 next writes the CH number of CH 3000 to one of the two input spaces of IOP 201 of IOP configuration table 400, and writes "available" to the other input space (Step 23-16).

Switch unit 23 then writes the IOP number of IOP 201 in the input space of CH 3000 of CH configuration table 500 (Step 23-17) and next transmits a report of the success of the recovery of CH 3000 to EPU 100 (Step 23-18).

By means of the operation of switch unit 23, IOP 201 is selected as the substitute of IOP 200 in which a fault occurred. In addition, IOP configuration table 400 takes on the form shown in FIG. 42. IOP 200 is set to "unavailable," whereby a setting such that IOP 201 controls CH 3000 is executed.

CH configuration table 500 takes on the form shown in FIG. 43, and setting is executed such that CH 3000 is controlled by IOP 201.

By means of the operation of switch unit 23, incorporation instructions that designate CH 3000 are provided to IOP 201.

When IOP 201 receives these incorporation instructions, incorporation unit 30 of IOP 201 begins operation (see FIG. 21).

Incorporation unit 30 controls processor 201-1 to read information from SLOT 0201-5 and, based on this information, checks whether SLOT 0201-5 is available or not (Steps 30-1-3).

In the present example, SLOT 0201-5 is unused at this time, and SLOT 0201-5 is therefore available. Incorporation unit 30 therefore makes settings in SLOT 0201-5 indicating that SLOT0201-5 is in use by CH 3000 and sets the control information of CH 3000 (Step 30-3).

Incorporation unit 30 then initializes CH 3000, and then makes settings in CH 3000 indicating that CH 3000 is controlled by IOP 201 (Step 30-5).

By means of the operation of switch unit 23, a report of the occurrence of a fault and a report of the success of recovery from the fault of CH 3000 are provided to EPU 100.

Reporting unit 12 of EPU 100 transmits a report of the occurrence of a fault of CH 3000 to the software (Step 12-2) and reporting unit 13 of EPU 100 transmits a report of the success of recovery from the fault of CH 3000 to the software (Step 13-2).

When the software receives the report of the occurrence of a fault of CH 3000 from EPU 100, the software cancels the data transfer instructions that designated CH 3000 and that were supplied to this point and then waits for the report of the recovery from the fault. The report of the recovery from the fault is supplied from EPU 100. If the software subsequently receives the report of recovery from the fault within a fixed time interval, the software again provides EPU 100 with the data transfer instructions that were canceled.

When the EPU 100 receives data transfer instructions that designate CH 3000 from the software, instruction unit 10 begins operation.

Instruction unit 10 reads the information of the input space of CH 3000 of CH configuration table 500 and, based on this information, checks whether CH 3000 is available or not (Steps 10-1 and 2).

In the present example, the IOP number of IOP 201 is stored in this input space at this time, and CH 3000 is available. Instruction unit 10 therefore provides data transfer instructions that designate CH 3000 to IOP 201 (Step 10-3) and reports the success of the instructions to the software (Step 10-4).

When IOP 201 receives data transfer instructions that designate CH 3000 from EPU 100, instruction unit 32 begins operation.

Instruction unit 32 controls processor 201-1 to read the information from SLOT 0201-5, and based on this information, checks the state of SLOT0201-5 (Steps 32-1-3).

In the present example, the information of CH 3000 (in use in CH 3000) is stored in SLOT 0201-5. Instruction unit 32 therefore controls CH 3000 based on this information to transfer data (Step 324) and reports the completion of data transfer to EPU 100 (Step 32-5).

When EPU 100 receives the report of the completion of data transfer from IOP 201, reporting unit 11 begins operation and reports the completion of data transfer to the software (Step 11-1).

Thus, even should a fault occur in IOP 200 when the software is performing data transfer between PU 4000 and memory 300 to 307 by way of CH 3000 and IOP 200, IOP 201 controls CH 3000 in place of IOP 200. The software is therefore able to perform data transfer without interruption.

The operation when IOP 200 in which a fault occurred is subsequently exchanged is identical to the previously described operation.

According to the present embodiment, when a fault is detected in a particular IOP, in place of this IOP, another IOP is placed in correspondence with the CH that corresponded to IOP in which the fault is present, and when data communication is subsequently performed with a PU (external device), in place of the IOP in which a fault is present, the other IOP executes data communication with the PU that uses the CH.

As a result, even should a fault occur in a particular IOP, another IOP executes data communication that uses the CH in place of this IOP. Thus, in spite of the occurrence of a fault in a particular IOP, data communication can be continued by way of the CH. Accordingly, halts and drops in performance of an information processor can be prevented.

Further, in the present embodiment, when a IOP in which a fault exists is exchanged for a new IOP, the new IOP is placed in correspondence with the CH in place of the other IOP and the correspondence relation between the CH and the new IOP then stored, and when data communication is performed with a PU, the new IOP executes data communication with the PU using the CH in place of the other IOP in accordance with this correspondence relation.

In this case, the IOP that has been exchanged can be placed in correspondence with CH automatically.

Conventionally, maintenance personnel exchanged an IOP in which a fault occurred for a new IOP and then incorporated this new IOP into the information processor. As a consequence, the possibility existed for the occurrence of halts of the information processor due to human error by the maintenance personnel, but according to the present embodiment, the potential for halts of the information processor due to human error can be reduced.

The configuration shown in the figures in the above-described embodiment is merely one example, and the present invention is not limited to this form.

For example, each IOP need not be provided in a CELL. In addition, each EPU need not be provided in a CELL.

Finally, each IOP need not be a device capable of controlling two CH and may be modified as appropriate.

While preferred embodiments of the present invention have been described using specific terms, such description is for illustrative purposes only, and it is to be understood that changes and variations may be made without departing from the spirit or scope of the following claims.

What is claimed is:

1. An information processor comprising:
   a channel device connected to an external device;
   a specific channel device that differs from said channel device and is connected to said external device independently of said channel device;
   a prescribed input/output processor that corresponds to said channel device;
   a specific input/output processor that differs from said prescribed input/output processor, wherein said specific input/output processor can be placed in correspondence with said specific channel device, and can be placed in correspondence with said channel device;
   a diagnostic processor for, upon detecting a fault of said prescribed input/output processor, placing said specific input/output processor in correspondence with the channel device in place of said prescribed input/output processor, then storing in itself the correspondence relation between the specific input/output processor and the channel device, and then supplying a fault recovery report, said correspondence relation indicating that the specific input/output processor is to control the channel device; and
   an arithmetic processor for, when performing data communication with said external device before receiving said fault recovery report, causing said prescribed input/output processor to execute data communication with said external device by using said channel device; and when performing data communication with said external device after receiving said fault recovery report, reading said correspondence relation from said diagnostic processor and then causing said specific input/output processor to execute data communication with said external device by using said channel device in accordance with the correspondence relation.

2. The information processor according to claim 1, wherein said specific input/output processor is a spare input/output processor.

3. The information processor according to claim 1, wherein:
   upon detecting the exchange of said prescribed input/output processor, said diagnostic processor places said prescribed input/output processor in correspondence with said channel device in place of said specific input/output processor, stores in itself the correspondence relation between said prescribed input/output processor and said channel device, and then issues an exchange completion report to said arithmetic processor; and
   said arithmetic processor, when data communication is performed with said external device after the reception of said exchange completion report, reads said correspondence relation from said diagnostic processor, and causes said prescribed input/output processor to execute data communication with said external device by using said channel device in accordance with the correspondence relation.

4. A data communication control method that is implemented by an information processor that includes a channel device that is connected to an external device, a specific channel device that differs from said channel device and is connected to said external device independently of said channel device, a prescribed input/output processor that corresponds to said channel device, and a specific input/output processor that differs from said prescribed input/output processor, wherein said specific input/output processor can be placed in correspondence with said specific channel device, and can be placed in correspondence with said channel device; said data communication control method comprising:
- a diagnostic processing step of, upon detection of a fault of said prescribed input/output processor, placing said specific input/output processor in correspondence with said channel device, storing the correspondence relation between said specific input/output processor and said channel device, and then supplying a fault recovery report said correspondence relation indicating that the specific input/output processor is to control the channel device; and
- a communication step of, when data communication is performed with said external device before receiving said fault recovery report, causing said prescribed input/output processor to execute data communication with said external device by using said channel device; and when data communication is performed with said external device after receiving said fault recovery report, causing said specific input/output processor to execute data communication with said external device by using said channel device in accordance with the correspondence relation between said specific input/output processor and said channel device.

5. The data communication control method according to claim 4, wherein said specific input/output processor is a spare input/output processor.

6. The data communication control method according to claim 4, further comprising:
- an exchange process step of, upon detection of the exchange of said prescribed input/output processor, placing said prescribed input/output processor in correspondence with said channel device and then storing the correspondence relation between said prescribed input/output processor and said channel device and supplying an exchange completion report; and
- a data communication step of, when data communication is performed with said external device after the reception of said exchange completion report, causing said prescribed input/output processor to execute data communication with said external device by using said channel device in accordance with the correspondence relation between said prescribed input/output processor and said channel device.

* * * * *